(12) United States Patent
Watanabe et al.

(10) Patent No.: US 12,553,859 B2
(45) Date of Patent: Feb. 17, 2026

(54) GAS SENSOR AND CONTROL METHOD OF GAS SENSOR

(71) Applicant: NGK INSULATORS, LTD., Nagoya (JP)

(72) Inventors: Yusuke Watanabe, Nagoya (JP); Daichi Ichikawa, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 533 days.

(21) Appl. No.: 18/079,027

(22) Filed: Dec. 12, 2022

(65) Prior Publication Data

US 2023/0194467 A1 Jun. 22, 2023

(30) Foreign Application Priority Data

Dec. 17, 2021 (JP) ................................. 2021-205382

(51) Int. Cl.
| | |
|---|---|
| *G01N 27/407* | (2006.01) |
| *G01N 27/409* | (2006.01) |
| *G01N 27/41* | (2006.01) |
| *G01N 27/419* | (2006.01) |
| *G01N 33/00* | (2006.01) |

(52) U.S. Cl.
CPC ........ *G01N 27/419* (2013.01); *G01N 27/4071* (2013.01); *G01N 27/4074* (2013.01); *G01N 27/409* (2013.01); *G01N 27/41* (2013.01); *G01N 33/0037* (2013.01)

(58) Field of Classification Search
CPC ............ G01N 27/419; G01N 27/4071; G01N 27/4074; G01N 27/409; G01N 27/4065; G01N 27/41; G01N 33/0037
See application file for complete search history.

(56) References Cited

U.S. PATENT DOCUMENTS

| | | | |
|---|---|---|---|
| 2015/0268188 A1* | 9/2015 | Murakami | ........... G01N 27/419 204/431 |
| 2016/0258897 A1* | 9/2016 | Sakakibara | ............ G01N 27/41 |
| 2022/0011261 A1* | 1/2022 | Sekiya | ............... G01N 27/4071 |

FOREIGN PATENT DOCUMENTS

WO 2020/196653 A1 10/2020

* cited by examiner

*Primary Examiner* — Alexander S Noguerola
(74) *Attorney, Agent, or Firm* — MATTINGLY & MALUR, PC

(57) ABSTRACT

A gas sensor includes a sensor element and a control unit for controlling the sensor element. The sensor element includes a main pump cell, an auxiliary pump cell, a measurement pump cell, and a reference electrode, wherein, in the main pump cell, a repeatedly on-off controlled main pump current is applied so that an auxiliary pump current flowing through the auxiliary pump cell is at a predetermined target current value, and, in the auxiliary pump cell, the auxiliary pump current is applied so that an electromotive force between an inner auxiliary pump electrode and the reference electrode is at a predetermined target voltage value. The control unit includes: a control power supply for applying the repeatedly on-off controlled main pump current; and a setting part for setting the target voltage value based on an electric potential difference generated between the inner main pump electrode and the reference electrode.

8 Claims, 6 Drawing Sheets

GAS SENSOR AND CONTROL METHOD OF GAS SENSOR

CROSS-REFERENCE TO RELATED APPLICATION

The present application claims priority from Japanese application JP2021-205382, filed on Dec. 17, 2021, the contents of which is hereby incorporated by reference into this application.

BACKGROUND OF THE INVENTION

Technical Field of the Invention

The present invention relates to a gas sensor and a control method of the gas sensor.

Background Art

A gas sensor is used for detection or measurement of concentration of an objective gas component (oxygen $O_2$, nitrogen oxide NOx, ammonia $NH_3$, hydrocarbon HC, carbon dioxide $CO_2$, etc.) in a measurement-object gas, such as exhaust gas of automobile. For example, conventionally, the concentration of the objective gas component in exhaust gas of an automobile is measured, and an exhaust gas cleaning system mounted on the automobile is optimally controlled based on the measurement.

As such a gas sensor, a gas sensor using an oxygen ion conductive solid electrolyte such as zirconia ($ZrO_2$) is known. For example, WO 2020/196653 A1 discloses a gas sensor having a main pump cell and an auxiliary pump cell that pump out oxygen, and a measurement pump cell that pumps out oxygen produced from the specific gas. When the gas sensor detects NOx as a specific gas, an oxygen partial pressure in a measurement-object gas is controlled to such a low level that does not substantially affect NOx measurement by the main pump cell and the auxiliary pump cell. NOx in the measurement-object gas whose oxygen partial pressure has been controlled is reduced in the measurement electrode, and a resulting oxygen is pumped out by the measurement pump cell to be detected as a current value.

WO 2020/196653 A1 also discloses that at least one pump cell of the one or more pump cells provided in the gas sensor pumps out the oxygen by applying a repeatedly on-off controlled pump current (a pulse current). WO 2020/196653 A1 discloses that thereby a change in the catalytic activity of an electrode due to use of the gas sensor can be suppressed.

CITATION LIST

Patent Document

Patent Document 1: WO 2020/196653 A1

SUMMARY OF THE INVENTION

Problems to be Solved by the Invention

With the tightening of automobile exhaust emission regulations and the like, a gas sensor is required to accurately measure even a lower-concentration target gas to be measured. Here, the low concentration means a concentration of, for example, about lower than 500 ppm, lower than 400 ppm, lower than 300 ppm, lower than 200 ppm, or lower than 100 ppm.

For example, in the conventional gas sensor disclosed in WO 2020/196653 A1, the oxygen partial pressure in a measurement-object gas is controlled to such a low level that does not substantially affect the measurement of a target gas to be measured (e.g., NOx) by the main pump cell and the auxiliary pump cell so that the measurement-object gas containing a predetermined low concentration of oxygen and the target gas to be measured reaches the measurement electrode. Then, oxygen generated at the measurement electrode from the target gas to be measured in the measurement-object gas is pumped out by the measurement pump cell so that a current value depending on the concentration of the target gas to be measured is detected.

However, when the target gas to be measured is at a concentration as low as about 10 to 500 ppm, there is a case where a detection value varies. As a result of studies by the present inventors, it has been revealed that there is a case where the amount of oxygen in the measurement-object gas that reaches the measurement electrode varies for some reason during the driving of the measurement-object gas gas sensor so that a current value detected in the measurement pump cell varies. When the amount of oxygen in the measurement-object gas that reaches the measurement electrode varies, a current value detected in the measurement pump cell varies (shifts) irrespective of the concentration of the target gas to be measured. It has been found that this may affect measurement accuracy particularly when the concentration of the target gas to be measured in the measurement-object gas is low.

It is therefore an object of the present invention to accurately measure even a low-concentration target gas to be measured. Specifically, it is an object of the present invention to accurately measure a target gas to be measured in a wide concentration range including a low-concentration target gas to be measured.

Means for Solving the Problems

As a result of intensive studies, the present inventors have found that even a low-concentration target gas to be measured can accurately be measured by controlling the concentration of oxygen in a measurement-object gas to be a predetermined concentration with higher accuracy according to the present invention described below.

The present invention includes the following aspects.

(1) A gas sensor for detecting a target gas to be measured in a measurement-object gas, the gas sensor comprising a sensor element and a control unit for controlling the sensor element, wherein the sensor element comprises:

a base part in an elongated plate shape, including an oxygen-ion-conductive solid electrolyte layer;

a measurement-object gas flow part formed from one end part in a longitudinal direction of the base part;

a main pump cell that includes: an inner main pump electrode disposed on an inner surface of the measurement-object gas flow part; and an outer main pump electrode disposed at a position different from the measurement-object gas flow part on the base part and corresponding to the inner main pump electrode;

an auxiliary pump cell that includes: an inner auxiliary pump electrode disposed at a position farther from the one end part in the longitudinal direction of the base part than the inner main pump electrode on the inner surface of the measurement-object gas flow part; and an outer auxiliary pump electrode disposed at a position different from the measurement-object gas flow part on the base part and corresponding to the inner auxiliary pump electrode;
a measurement pump cell that includes: an inner measurement electrode disposed at a position farther from the one end part in the longitudinal direction of the base part than the inner auxiliary pump electrode on the inner surface of the measurement-object gas flow part; and an outer measurement electrode disposed at a position different from the measurement-object gas flow part on the base part and corresponding to the inner measurement electrode; and
a reference electrode disposed inside the base part to be in contact with a reference gas,
wherein, in the main pump cell, a repeatedly on-off controlled main pump current is applied so that an auxiliary pump current flowing through the auxiliary pump cell is at a predetermined target current value, and
in the auxiliary pump cell, the auxiliary pump current is applied so that an electromotive force between the inner auxiliary pump electrode and the reference electrode is at a predetermined target voltage value, and
the control unit comprises:
a control power supply for applying the repeatedly on-off controlled main pump current in the main pump cell; and
a setting part for setting the target voltage value in the auxiliary pump cell,
wherein the setting part obtains an electric potential difference generated between the inner main pump electrode and the reference electrode, and sets the target voltage value in the auxiliary pump cell based on the electric potential difference.

(2) The gas sensor according to the above (1), wherein the setting part obtains the electric potential difference generated between the inner main pump electrode and the reference electrode in an off period in which the main pump current does not flow by the control power supply in the main pump cell.

(3) The gas sensor according to the above (1) or (2), wherein the setting part obtains the electric potential difference generated between the inner main pump electrode and the reference electrode in a stable period in which the main pump current does not flow by the control power supply in the main pump cell and the electric potential difference does not change due to the main pump current that was flowing.

(4) The gas sensor according to any one of the above (1) to (3), wherein
the control power supply comprises a pulse power supply for cyclically turning the main pump current on and off, and
the setting part obtains the electric potential difference generated between the inner main pump electrode and the reference electrode in each cycle T of the pulse power supply at a predetermined time point included in an off period in which the main pump current does not flow by the pulse power supply during the cycle T.

(5) A control method of a gas sensor for detecting a target gas to be measured in a measurement-object gas, the gas sensor comprising a sensor element and a control unit for controlling the sensor element, wherein
the sensor element comprises:
a base part in an elongated plate shape, including an oxygen-ion-conductive solid electrolyte layer;
a measurement-object gas flow part formed from one end part in a longitudinal direction of the base part;
a main pump cell that includes: an inner main pump electrode disposed on an inner surface of the measurement-object gas flow part; and an outer main pump electrode disposed at a position different from the measurement-object gas flow part on the base part and corresponding to the inner main pump electrode;
an auxiliary pump cell that includes: an inner auxiliary pump electrode disposed at a position farther from the one end part in the longitudinal direction of the base part than the inner main pump electrode on the inner surface of the measurement-object gas flow part; and an outer auxiliary pump electrode disposed at a position different from the measurement-object gas flow part on the base part and corresponding to the inner auxiliary pump electrode;
a measurement pump cell that includes: an inner measurement electrode disposed at a position farther from the one end part in the longitudinal direction of the base part than the inner auxiliary pump electrode on the inner surface of the measurement-object gas flow part; and an outer measurement electrode disposed at a position different from the measurement-object gas flow part on the base part and corresponding to the inner measurement electrode; and
a reference electrode disposed inside the base part to be in contact with a reference gas, and
the control unit comprises:
a control power supply for applying a repeatedly on-off controlled main pump current in the main pump cell, and
the control method comprising:
a setting step of obtaining an electric potential difference generated between the inner main pump electrode and the reference electrode, and setting a target voltage value of an electromotive force between the inner auxiliary pump electrode and the reference electrode in the auxiliary pump cell based on the electric potential difference; and
an oxygen concentration adjusting step of controlling the control power supply to apply the repeatedly on-off controlled main pump current in the main pump cell so that an auxiliary pump current flowing through the auxiliary pump cell is at a predetermined target current value, and applying the auxiliary pump current in the auxiliary pump cell so that an electromotive force between the inner auxiliary pump electrode and the reference electrode is at the target voltage value.

(6) The control method according to the above (5), wherein, in the setting step, the electric potential difference generated between the inner main pump electrode and the reference electrode is obtained in an off period in which the main pump current does not flow by the control power supply in the main pump cell.

(7) The control method according to the above (5) or (6), wherein, in the setting step, the electric potential difference generated between the inner main pump electrode and the reference electrode is obtained in a stable period in which the main pump current does not flow by the control power supply in the main pump cell and the electric potential difference does not change due to the main pump current that was flowing.

(8) The control method according to any one of the above (5) to (7), wherein the control power supply comprises a pulse power supply for cyclically turning the main pump current on and off, and in the setting step, the electric potential difference generated between the inner main pump electrode and the reference electrode is obtained in each cycle T of the pulse power supply at a predetermined time point included in an off period in which the main pump current does not flow by the pulse power supply during the cycle T.

Advantageous Effect of the Invention

According to the present invention, it is possible to accurately measure even a low-concentration target gas to be measured. Specifically, according to the present invention, it is possible to accurately measure a target gas to be measured in a wide concentration range including a low-concentration target gas to be measured.

BRIEF DESCRIPTION OF THE DRAWINGS

FIG. 4(1) is a graph schematically showing a temporal change in the main pump current Ip0. The horizontal axis of the graph represents time t and the vertical axis of the graph represents the main pump current Ip0. FIG. 4(2) is a graph schematically showing a temporal change in the electric potential difference V0. The horizontal axis of the graph represents time t and the vertical axis of the graph represents the electric potential difference V0.

FIG. 5(1) is a graph schematically showing a temporal change in the main pump current Ip0. The horizontal axis of the graph represents time t and the vertical axis of the graph represents the main pump current Ip0. FIG. 5(2) is a graph schematically showing a temporal change in the electric potential difference V0. The horizontal axis of the graph represents time t and the vertical axis of the graph represents the electric potential difference V0.

MODES FOR CARRYING OUT OF THE INVENTION

A gas sensor of the present invention includes a sensor element and a control unit for controlling the sensor element.

The sensor element contained in the gas sensor of the present invention includes:

a base part in an elongated plate shape, including an oxygen-ion-conductive solid electrolyte layer;

a measurement-object gas flow part formed from one end part in a longitudinal direction of the base part;

a main pump cell that includes: an inner main pump electrode disposed on an inner surface of the measurement-object gas flow part; and an outer main pump electrode disposed at a position different from the measurement-object gas flow part on the base part and corresponding to the inner main pump electrode;

an auxiliary pump cell that includes: an inner auxiliary pump electrode disposed at a position farther from the one end part in the longitudinal direction of the base part than the inner main pump electrode on the inner surface of the measurement-object gas flow part; and an outer auxiliary pump electrode disposed at a position different from the measurement-object gas flow part on the base part and corresponding to the inner auxiliary pump electrode;

a measurement pump cell that includes: an inner measurement electrode disposed at a position farther from the one end part in the longitudinal direction of the base part than the inner auxiliary pump electrode on the inner surface of the measurement-object gas flow part; and an outer measurement electrode disposed at a position different from the measurement-object gas flow part on the base part and corresponding to the inner measurement electrode; and a reference electrode disposed inside the base part to be in contact with a reference gas, wherein, in the main pump cell, a repeatedly on-off controlled main pump current is applied so that an auxiliary pump current flowing through the auxiliary pump cell is at a predetermined target current value, and in the auxiliary pump cell, the auxiliary pump current is applied so that an electromotive force between the inner auxiliary pump electrode and the reference electrode is at a predetermined target voltage value.

The control unit contained in the gas sensor of the present invention includes:

a control power supply for applying the repeatedly on-off controlled main pump current in the main pump cell; and a setting part for setting the target voltage value in the auxiliary pump cell, wherein the setting part obtains an electric potential difference generated between the inner main pump electrode and the reference electrode, and sets the target voltage value in the auxiliary pump cell based on the electric potential difference.

The control power supply includes a pulse power supply and the like.

Hereinafter, an example of an embodiment of a gas sensor of the present invention will be described in detail.

[General Configuration of Gas Sensor]

Figure 1:
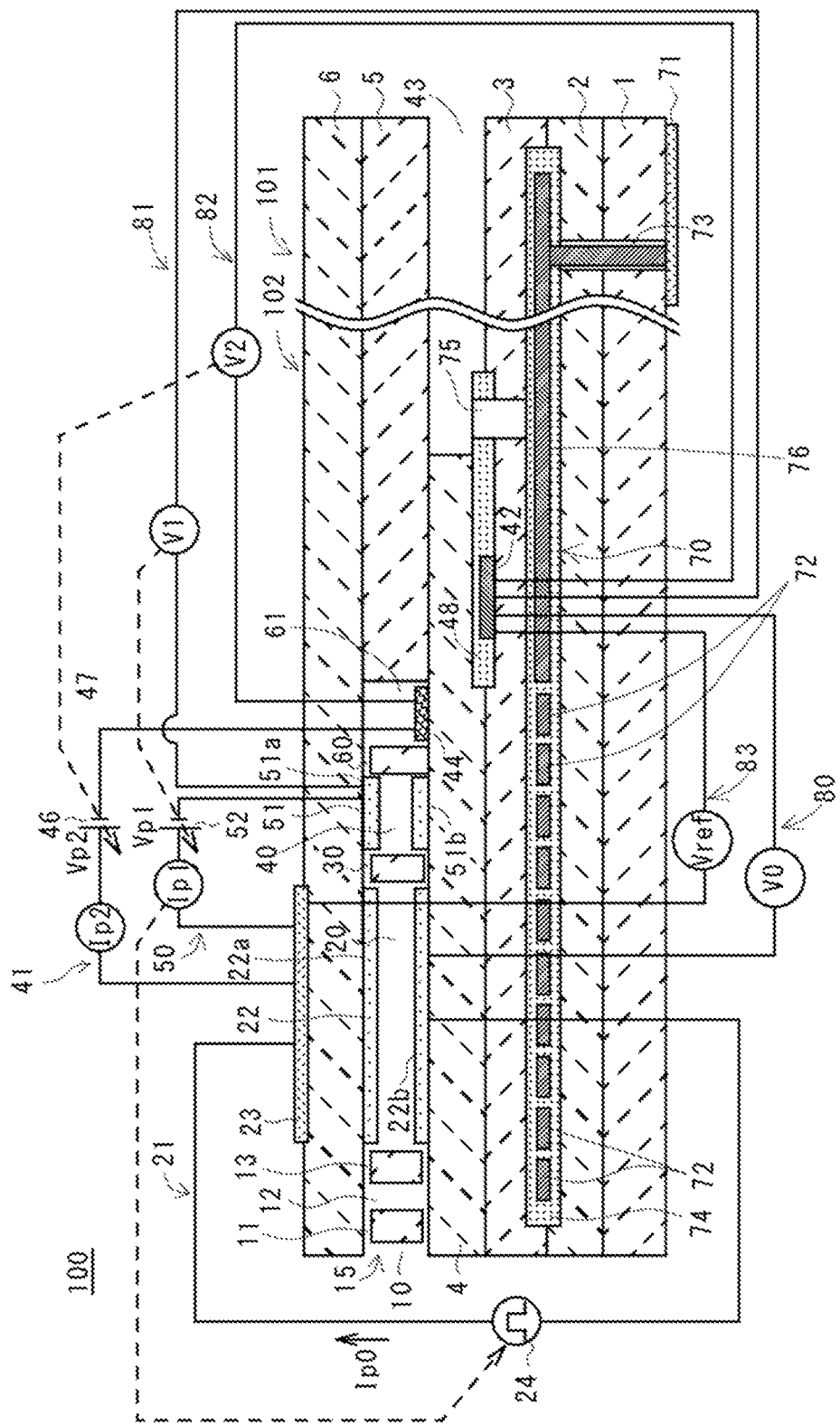
FIG. 1 is a vertical sectional schematic view in the longitudinal direction, showing one example of a general configuration of a gas sensor 100.

The gas sensor of the present invention will now be described with reference to the drawings. FIG. 1 is a vertical sectional schematic view in the longitudinal direction, showing one example of a general configuration of a gas sensor 100 including a sensor element 101. Hereinafter, based on FIG. 1, the upper side and the lower side in FIG. 1 are respectively defined as top and bottom, and the left side and the right side in FIG. 1 are respectively defined as a front end side and a rear end side.

In FIG. 1, the gas sensor 100 represents one example of a NOx sensor that detects NOx in a measurement-object gas by the sensor element 101, and measures the concentration of NOx.

Figure 2:
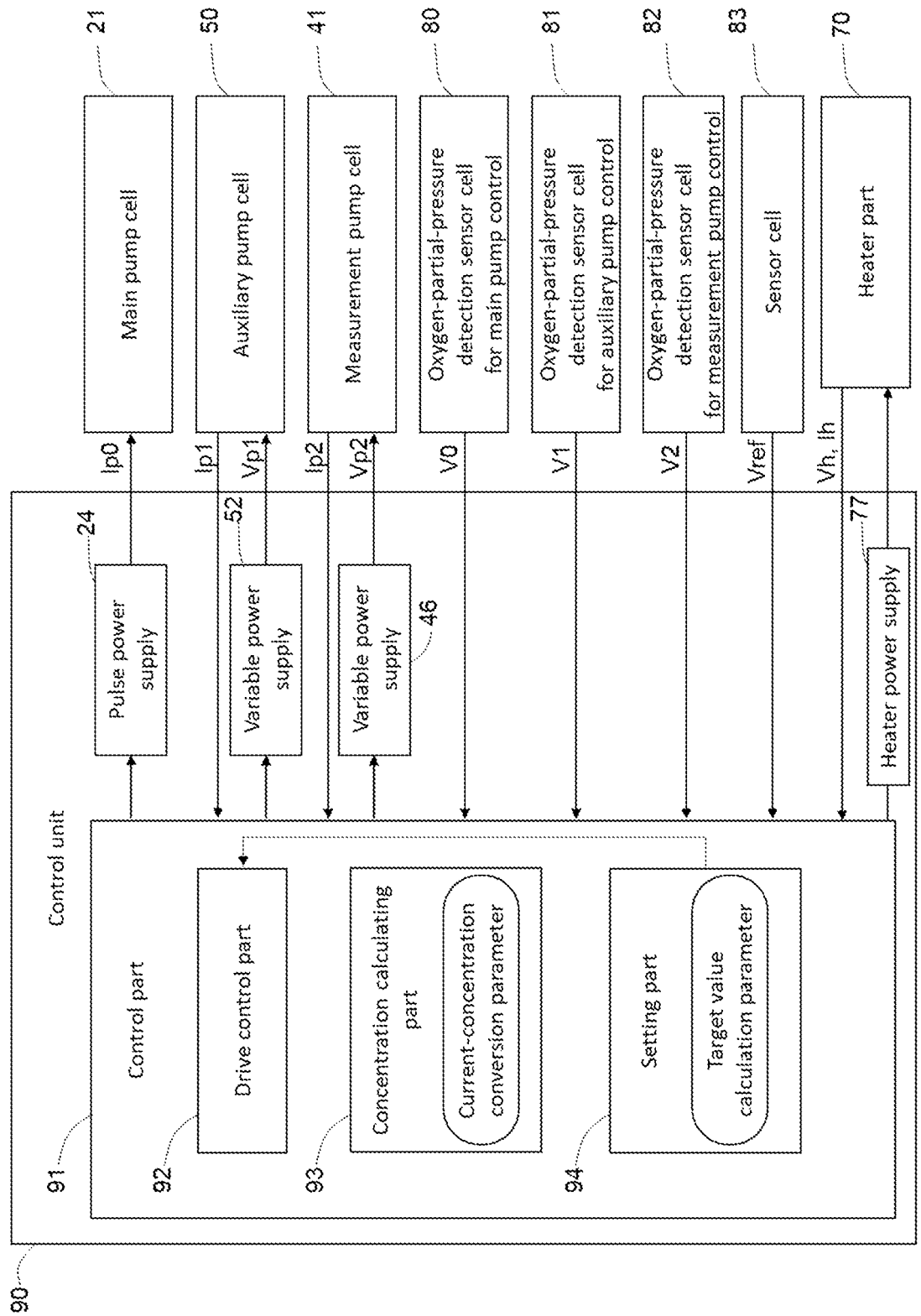
FIG. 2 is a block diagram showing electric connections between the control unit 90 and respective pump cells 21, 50, and 41, respective sensor cells 80, 81, 82, and 83, and a heater part 70 of the sensor element 101.

Further, the gas sensor 100 includes a control unit 90 for controlling the sensor element 101. The control unit 90 includes a pulse power supply 24 as one example of a control power supply for applying a repeatedly on-off controlled main pump current Ip0 in a main pump cell 21 as will be described later. FIG. 2 is a block diagram showing electric connections between the control unit 90 and the sensor element 101.

(Sensor Element)

The sensor element 101 is an element in an elongated plate shape, including a base part 102 having such a structure that a plurality of oxygen-ion-conductive solid electrolyte layers are layered. The elongated plate shape also called a long plate shape or a belt shape. The base part 102 has such a structure that six layers, namely, a first substrate layer 1, a second substrate layer 2, a third substrate layer 3, a first solid electrolyte layer 4, a spacer layer 5, and a second solid electrolyte layer 6, are layered in this order from the bottom side, as viewed in the drawing. Each of the six layers is formed of an oxygen-ion-conductive solid electrolyte layer containing, for example, zirconia ($ZrO_2$). The solid electrolyte forming these six layers is dense and gastight. These six layers all may have the same thickness, or the thickness may vary among the layers. The layers are adhered to each other with an adhesive layer of a solid electrolyte interposed therebetween, and the base part 102 includes the adhesive layer. While a layer configuration composed of the six layers is illustrated in FIG. 1, the layer configuration in the present invention is not limited to this, and any number of layers and any layer configuration are possible.

The sensor element 101 is manufactured, for example, by stacking ceramic green sheets corresponding to the individual layers after conducting predetermined processing, printing of circuit pattern and the like, and then firing the stacked ceramic green sheets so that they are combined together.

A gas inlet 10 is formed between the lower surface of the second solid electrolyte layer 6 and the upper surface of the first solid electrolyte layer 4 in one end part in the longitudinal direction (hereinafter, referred to as a front end part) of the sensor element 101. A measurement-object gas flow part 15 is formed in such a form that a first diffusion-rate limiting part 11, a buffer space 12, a second diffusion-rate limiting part 13, a first internal cavity 20, a third diffusion-rate limiting part 30, a second internal cavity 40, a fourth diffusion-rate limiting part 60, and a third internal cavity 61 communicate in this order in the longitudinal direction from the gas inlet 10.

The gas inlet 10, the buffer space 12, the first internal cavity 20, the second internal cavity 40, and the third internal cavity 61 constitute internal spaces of the sensor element 101. Each of the internal spaces is provided in such a manner that a portion of the spacer layer 5 is hollowed out, and the top of each of the internal spaces is defined by the lower surface of the second solid electrolyte layer 6, the bottom of each of the internal spaces is defined by the upper surface of the first solid electrolyte layer 4, and the lateral surface of each of the internal spaces is defined by the lateral surface of the spacer layer 5.

Each of the first diffusion-rate limiting part 11, the second diffusion-rate limiting part 13, and the third diffusion-rate limiting part 30 is provided as two laterally elongated slits (having the longitudinal direction of the openings in the direction perpendicular to the figure in FIG. 1). Each of the first diffusion-rate limiting part 11, and the second diffusion-rate limiting part 13 may be in such a form that a desired diffusion resistance is created, but the form is not limited to the slits.

The fourth diffusion-rate limiting part 60 is provided as a single laterally elongated slit (having the longitudinal direction of the opening in the direction perpendicular to the figure in FIG. 1) between the spacer layer 5 and the second solid electrolyte layer 6. The fourth diffusion-rate limiting part 60 may be in such a form that a desired diffusion resistance is created, but the form is not limited to the slit.

Also, at a position farther from the front end than the measurement-object gas flow part 15, a reference gas introduction space 43 is disposed between the upper surface of the third substrate layer 3 and the lower surface of the spacer layer 5 at a position where the reference gas introduction space 43 is laterally defined by the lateral surface of the first solid electrolyte layer 4. The reference gas introduction space 43 has an opening in the other end part (hereinafter, referred to as a rear end part) of the sensor element 101. As a reference gas for NOx concentration measurement, for example, air is introduced into the reference gas introduction space 43.

An air introduction layer 48 is a layer formed of porous alumina, and is so configured that a reference gas is introduced into the air introduction layer 48 via the reference gas introduction space 43. The air introduction layer 48 is formed to cover a reference electrode 42.

The reference electrode 42 is an electrode sandwiched between the upper surface of the third substrate layer 3 and the first solid electrolyte layer 4, and as described above, the air introduction layer 48 leading to the reference gas introduction space 43 is disposed around the reference electrode 42. That is, the reference electrode 42 is disposed to be in contact with a reference gas via the air introduction layer 48 which is a porous material, and the reference gas introduction space 43. As will be described later, the reference electrode 42 can be used to measure the oxygen concentration (oxygen partial pressure) in the first internal cavity 20, the second internal cavity 40, and the third internal cavity 61. The reference electrode 42 is formed as a porous cermet electrode (e.g., a cermet electrode of Pt and $ZrO_2$).

In the measurement-object gas flow part 15, the gas inlet 10 is open to the external space, and the measurement-object gas is taken into the sensor element 101 from the external space through the gas inlet 10.

In the present embodiment, the measurement-object gas flow part 15 is in such a form that the measurement-object gas is introduced through the gas inlet 10 that is open on the front end surface of the sensor element 101, however, the present invention is not limited to this form. For example, the measurement-object gas flow part 15 need not have a recess of the gas inlet 10. In this case, the first diffusion-rate limiting part 11 substantially serves as a gas inlet.

For example, the measurement-object gas flow part 15 may have an opening that communicates with the buffer space 12 or a position near the buffer space 12 of the first internal cavity 20, on a lateral surface along the longitudinal direction of the base part 102. In this case, the measurement-object gas is introduced from the lateral surface along the longitudinal direction of the base part 102 through the opening.

Further, for example, the measurement-object gas flow part 15 may be so configured that the measurement-object gas is introduced through a porous body.

The first diffusion-rate limiting part 11 creates a predetermined diffusion resistance to the measurement-object gas taken through the gas inlet 10.

The buffer space 12 is provided to guide the measurement-object gas introduced from the first diffusion-rate limiting part 11 to the second diffusion-rate limiting part 13.

The second diffusion-rate limiting part 13 creates a predetermined diffusion resistance to the measurement-object gas introduced into the first internal cavity 20 from the buffer space 12.

It suffices that the amount of the measurement-object gas to be introduced into the first internal cavity 20 falls within a predetermined range. That is, it suffices that a predetermined diffusion resistance is created in a whole from the front end part of the sensor element 101 to the second diffusion-rate limiting part 13. For example, the first diffusion-rate limiting part 11 may directly communicate with the first internal cavity 20, or the buffer space 12 and the second diffusion-rate limiting part 13 may be absent.

The buffer space 12 is provided to mitigate the influence of pressure fluctuation on the detected value when the pressure of the measurement-object gas fluctuates.

When the measurement-object gas is introduced from outside the sensor element 101 into the first internal cavity 20, the measurement-object gas, which is rapidly taken through the gas inlet 10 into the sensor element 101 due to pressure fluctuation of the measurement-object gas in the external space (pulsations in exhaust pressure if the measurement-object gas is automotive exhaust gas), is not directly introduced into the first internal cavity 20. Rather, the measurement-object gas is introduced into the first internal cavity 20 after the pressure fluctuation of the measurement-object gas is eliminated through the first diffusion-rate limiting part 11, the buffer space 12, and the second diffusion-rate limiting part 13. Thus, the pressure fluctuation of the measurement-object gas introduced into the first internal cavity 20 becomes almost negligible.

The first internal cavity 20 is provided as a space for adjusting the oxygen partial pressure in the measurement-object gas introduced through the second diffusion-rate limiting part 13. The oxygen partial pressure is adjusted by operation of the main pump cell 21.

The main pump cell 21 is an electrochemical pump cell including an inner main pump electrode 22 disposed on an inner surface of the measurement-object gas flow part 15, and an outer main pump electrode (in this embodiment, an outer pump electrode 23) disposed at a position different from the measurement-object gas flow part 15 on the base part 102 (in FIG. 1, on an outer surface of the base part 102) and corresponding to the inner main pump electrode 22. The phrase "corresponding to the inner main pump electrode 22" means that the outer pump electrode 23 and the inner main pump electrode 22 are provided with the second solid electrolyte layer 6 being interposed therebetween.

That is, the main pump cell 21 is an electrochemical pump cell composed of the inner main pump electrode 22 having a ceiling electrode portion 22a disposed over substantially the entire surface of the lower surface of the second solid electrolyte layer 6 that faces the first internal cavity 20, the outer pump electrode 23 disposed on a region of the upper surface of the second solid electrolyte layer 6 that corresponds to the ceiling electrode portion 22a so as to be exposed to the external space, and the second solid electrolyte layer 6 sandwiched between the inner main pump electrode 22 and the outer pump electrode 23.

The inner main pump electrode 22 is formed to span the upper and lower solid electrolyte layers (the second solid electrolyte layer 6 and the first solid electrolyte layer 4) that define the first internal cavity 20 and the spacer layer 5 that defines the lateral wall. Specifically, the ceiling electrode portion 22a is formed on the lower surface of the second solid electrolyte layer 6 that defines the ceiling surface of the first internal cavity 20, and a bottom electrode portion 22b is formed on the upper surface of the first solid electrolyte layer 4 that defines the bottom surface of the first internal cavity 20. Also, lateral electrode portions (not shown) are formed on the lateral wall surfaces (inner surface) of the spacer layer 5 that form both lateral wall parts of the first internal cavity 20 so as to connect the ceiling electrode portion 22a and the bottom electrode portion 22b. Thus, the inner main pump electrode 22 is provided as a tunnel-like structure in the area where the lateral electrode portions are disposed.

The inner main pump electrode 22 and the outer pump electrode 23 are porous cermet electrodes (electrodes in a state that a metal component and a ceramic component are mixed). The ceramic component to be used is not particularly limited, but is preferably an oxygen-ion-conductive solid electrolyte as in the case of the base part 102. For example, $ZrO_2$ can be used as the ceramic component.

The inner main pump electrode 22 to be in contact with a measurement-object gas is formed using a material having a weakened reducing ability with respect to a NOx component in the measurement-object gas. The inner main pump electrode 22 preferably contains a noble metal having catalytic activity (e.g., at least one of Pt, Rh, Ir, Ru, and Pd) and a noble metal (e.g., Au, Ag) that reduces the catalytic activity of a noble metal having catalytic activity with respect to a target gas to be measured (in this embodiment, NOx). In this embodiment, the inner main pump electrode 22 is formed as a porous cermet electrode made of Pt containing 1% of Au and $ZrO_2$.

The outer pump electrode 23 may contain the above-described noble metal having catalytic activity. Similarly, the reference electrode 42 may contain the above-described noble metal having catalytic activity. In this embodiment, the outer pump electrode 23 is formed as a porous cermet electrode made of Pt and $ZrO_2$.

In the main pump cell 21, the pulse power supply 24 as an example of the control power supply applies the main pump current Ip0 between the inner main pump electrode 22 and the outer pump electrode 23 in a positive direction or a negative direction, and thus it is possible to pump out oxygen in the first internal cavity 20 to the external space or pump oxygen into the first internal cavity 20 from the external space. Here, the direction of an arrow of the main pump current Ip0 in FIG. 1 is defined as a positive direction.

In this embodiment, the pulse power supply 24 as the control power supply is configured as a current supply. The pulse power supply 24 applies the repeatedly on-off controlled main pump current Ip0, that is, an intermittent main pump current Ip0 between the inner main pump electrode 22 and the outer pump electrode 23. The pulse power supply 24 is configured to be able to apply the intermittent main pump current Ip0 in either positive or negative direction. The structure of the pulse power supply 24 can appropriately be determined by those skilled in the art. For example, as the pulse power supply 24, a pulse power supply that can generate a pulse current in both directions may be used or two or more pulse power supplies that generate a pulse current in one direction may be used in combination.

To detect the oxygen concentration (oxygen partial pressure) in the atmosphere in the first internal cavity 20, the inner main pump electrode 22, the second solid electrolyte layer 6, the spacer layer 5, the first solid electrolyte layer 4, the third substrate layer 3, and the reference electrode 42 form an electrochemical sensor cell, namely, an oxygen-partial-pressure detection sensor cell 80 for main pump control.

The oxygen concentration (oxygen partial pressure) in the first internal cavity 20 can be detected from an electromotive force V0 measured in the oxygen-partial-pressure detection sensor cell 80 for main pump control.

The third diffusion-rate limiting part 30 creates a predetermined diffusion resistance to the measurement-object gas whose oxygen concentration (oxygen partial pressure) has been controlled in the first internal cavity 20 by the operation of the main pump cell 21 described below, and guides the measurement-object gas into the second internal cavity 40.

The second internal cavity 40 is provided as a space for adjusting the oxygen partial pressure in the measurement-object gas introduced through the third diffusion-rate limiting part 30 more accurately. The oxygen partial pressure is adjusted by operation of the auxiliary pump cell 50.

After the oxygen concentration (oxygen partial pressure) in the measurement-object gas is adjusted in advance in the first internal cavity 20, the measurement-object gas is introduced through the third diffusion-rate limiting part 30, and is further subjected to adjustment of the oxygen partial pressure by the auxiliary pump cell 50 in the second internal cavity 40. Thus, the oxygen concentration in the second internal cavity 40 can be kept constant with high accuracy, and the NOx concentration can be measured with high accuracy in the gas sensor 100.

The auxiliary pump cell 50 is an electrochemical pump cell including an inner auxiliary pump electrode (in this embodiment, the auxiliary pump electrode 51) disposed at a position farther from the front end portion in the longitudinal direction of the base part 102 than the inner main pump electrode 22 on the inner surface of the measurement-object gas flow part 15, and an outer auxiliary pump electrode disposed at a position different from the measurement-object gas flow part 15 on the base part 102 and corresponding to the inner auxiliary pump electrode. In this embodiment, the outer pump electrode 23 disposed on the outer surface of the base part 102 functions also as the outer auxiliary pump electrode. The phrase "corresponding to the inner auxiliary pump electrode" means that the outer pump electrode 23 and the auxiliary pump electrode 51 are provided with the second solid electrolyte layer 6 being interposed therebetween.

That is, the auxiliary pump cell 50 is an auxiliary electrochemical pump cell composed of the auxiliary pump electrode 51 having a ceiling electrode portion 51a disposed on substantially the entire surface of lower surface of the second solid electrolyte layer 6 facing with the second internal cavity 40, the outer pump electrode 23 (the outer electrode is not limited to the outer pump electrode 23, but may be any suitable electrode outside the sensor element 101), and the second solid electrolyte layer 6.

This auxiliary pump electrode 51 is disposed in the second internal cavity 40 in a tunnel-like structure similar to the inner main pump electrode 22 disposed in the first internal cavity 20 described previously. Specifically, in the tunnel-like structure, the ceiling electrode portion 51a is formed on the second solid electrolyte layer 6 that defines the ceiling surface of the second internal cavity 40, a bottom electrode portion 51b is formed on the first solid electrolyte layer 4 that defines the bottom surface of the second internal cavity 40, and lateral electrode portions (not shown) connecting the ceiling electrode portion 51a and the bottom electrode portion 51b are formed on the wall surfaces of the spacer layer 5 that define the lateral walls of the second internal cavity 40.

It is to be noted that the auxiliary pump electrode 51 is formed using a material having a weakened ability to reduce a NOx component in the measurement-object gas, as with the case of the inner main pump electrode 22. The auxiliary pump electrode 51, as with the case of the inner main pump electrode 22, preferably contains a noble metal having catalytic activity (e.g., at least one of Pt, Rh, Jr, Ru, and Pd) and a noble metal (e.g., Au, Ag) that reduces the catalytic activity of a noble metal having catalytic activity with respect to a target gas to be measured (in this embodiment, NOx). In this embodiment, the auxiliary pump electrode 51 is formed as a porous cermet electrode made of Pt containing 1% of Au and $ZrO_2$.

In the auxiliary pump cell 50, by applying a desired voltage Vp1 between the auxiliary pump electrode 51 and the outer pump electrode 23 by a variable power supply 52, it is possible to pump out oxygen in the atmosphere in the second internal cavity 40 to the external space, or pump the oxygen into the second internal cavity 40 from the external space.

To control the oxygen partial pressure in the atmosphere in the second internal cavity 40, the auxiliary pump electrode 51, the reference electrode 42, the second solid electrolyte layer 6, the spacer layer 5, the first solid electrolyte layer 4, and the third substrate layer 3 constitute an electrochemical sensor cell, namely, an oxygen-partial-pressure detection sensor cell 81 for auxiliary pump control.

In the main pump cell 21, the repeatedly on-off controlled main pump current Ip0 is applied so that an auxiliary pump current Ip1 flowing through the auxiliary pump cell 50 is at a predetermined target current value to adjust oxygen concentration in the measurement-object gas to a concentration to be adopted in the auxiliary pump cell 50, that is, a concentration to be introduced into the second internal cavity 40.

In the auxiliary pump cell 50, the auxiliary pump current Ip1 is applied so that an electromotive force V1 between the auxiliary pump electrode 51 and the reference electrode 42 is at a predetermined target voltage value to adjust oxygen concentration in the measurement-object gas to a concentration to be adopted in a measurement pump cell 41 that will be described later, that is, a concentration to be introduced into the third internal cavity 61.

The auxiliary pump cell 50 performs pumping with the variable power supply 52 whose voltage is controlled on the basis of the electromotive force V1 detected by the oxygen-partial-pressure detection sensor cell 81 for auxiliary pump control. Thus, the oxygen partial pressure in the atmosphere in the second internal cavity 40 is controlled to such a low partial pressure that does not substantially affect measurement of NOx.

In addition, the auxiliary pump current Ip1 is used for control of the pulse power supply 24 of the main pump cell 21. Specifically, the auxiliary pump current Ip1 or a control signal based on the auxiliary pump current Ip1 is input to the pulse power supply 24, the main pump current Ip0 is applied by controlling the pulse power supply 24, and thus, in the main pump cell 21, oxygen in the first internal cavity 20 is pumped out to the external space or oxygen in the external spaces pumped into the first internal cavity 20.

By operating the main pump cell 21 and the auxiliary pump cell 50 in this manner, the gradient of the oxygen partial pressure in the measurement-object gas introduced into the second internal cavity 40 from the third diffusion-rate limiting part 30 is controlled to remain constant. In using as a NOx sensor, the oxygen concentration in the second internal cavity 40 is kept at a predetermined concentration by the actions of the main pump cell 21 and the auxiliary pump cell 50. The oxygen concentration in the second internal cavity 40 may be kept at, for example, about 0.1 ppm or less, 0.01 ppm or less, 0.001 ppm or less, or 0.0001 ppm. In this embodiment, the oxygen concentration in the second internal cavity 40 is kept at a constant value of about 0.001 ppm.

The fourth diffusion-rate limiting part 60 creates a predetermined diffusion resistance to the measurement-object gas whose oxygen concentration (oxygen partial pressure) has been controlled to further low in the second internal cavity 40 by the operation of the auxiliary pump cell 50, and guides the measurement-object gas into the third internal cavity 61.

The third internal cavity 61 is provided as a space for measuring nitrogen oxide (NOx) concentration in the measurement-object gas introduced through the fourth diffusion-rate limiting part 60. By the operation of the measurement pump cell 41, NOx concentration is measured.

The measurement pump cell 41 is an electrochemical pump cell including an inner measurement electrode (in this embodiment, a measurement electrode 44) disposed at a position farther from the front end portion in the longitudinal direction of the base part 102 than the inner auxiliary pump electrode (in this embodiment, the auxiliary pump electrode 51) on the inner surface of the measurement-object gas flow part 15, and an outer measurement electrode disposed at a position different from the measurement-object gas flow part 15 on the base part 102 and corresponding to the inner measurement electrode. In this embodiment, the outer pump electrode 23 disposed on the outer surface of the base part 102 functions also as the outer measurement electrode. The phrase "corresponding to the inner measurement electrode" means that the outer pump electrode 23 and the measurement electrode 44 are provided with the second solid electrolyte layer 6, the spacer layer 5, and the first solid electrolyte layer 4 being interposed therebetween.

That is, the measurement pump cell 41 is an electrochemical pump cell composed of the measurement electrode 44 disposed on the upper surface of the first solid electrolyte layer 4 facing with the third internal cavity 61, the outer pump electrode 23 (the outer electrode is not limited to the outer pump electrode 23, but may be any suitable electrode outside the sensor element 101), the second solid electrolyte layer 6, the spacer layer 5, and the first solid electrolyte layer 4. The measurement pump cell 41 measures NOx concentration in the measurement-object gas in the third internal cavity 61.

The measurement electrode 44 is a porous cermet electrode. The measurement electrode 44 functions also as a NOx reduction catalyst that reduces NOx present in the atmosphere in the third internal cavity 61. The measurement electrode 44 is an electrode containing a noble metal having catalytic activity (e.g., at least one of Pt, Rh, Jr, Ru, and Pd). It is preferred that the measurement electrode 44 does not contain a noble metal (e.g., Au, Ag) that reduces the catalytic activity of a noble metal having catalytic activity with respect to a target gas to be measured (in this embodiment, NOx). In this embodiment, the measurement electrode 44 is formed as a porous cermet electrode made of Pt and Rh, and $ZrO_2$.

To detect the oxygen partial pressure around the measurement electrode 44, the second solid electrolyte layer 6, the spacer layer 5, the first solid electrolyte layer 4, the third substrate layer 3, the measurement electrode 44, and the reference electrode 42 constitute an electrochemical sensor cell, namely an oxygen-partial-pressure detection sensor cell 82 for measurement pump control. A variable power supply 46 is controlled on the basis of an electromotive force V2 detected by the oxygen-partial-pressure detection sensor cell 82 for measurement pump control.

The measurement-object gas introduced into the second internal cavity 40 reaches the measurement electrode 44 in the third internal cavity 61 through the fourth diffusion-rate limiting part 60 under the condition that the oxygen partial pressure is controlled. Nitrogen oxide in the measurement-object gas around the measurement electrode 44 is reduced ($2NO \rightarrow N_2 + O_2$) to generate oxygen. The generated oxygen is to be pumped by the measurement pump cell 41, and at this time, a voltage Vp2 of the variable power supply 46 is controlled so that the electromotive force V2 detected by the oxygen-partial-pressure detection sensor cell 82 for measurement pump control is constant. Since the amount of oxygen generated around the measurement electrode 44 is proportional to the concentration of nitrogen oxide in the measurement-object gas, nitrogen oxide concentration in the measurement-object gas is calculated by using a measurement pump current Ip2 in the measurement pump cell 41.

Also, the second solid electrolyte layer 6, the spacer layer 5, the first solid electrolyte layer 4, the third substrate layer 3, the outer pump electrode 23, and the reference electrode 42 constitute an electrochemical sensor cell 83, and it is possible to detect the oxygen partial pressure in the measurement-object gas outside the sensor by an electromotive force Vref obtained by the sensor cell 83.

The sensor element 101 further includes a heater part 70 that functions as a temperature regulator of heating and maintaining the temperature of the sensor element 101 so as to enhance the oxygen ion conductivity of the solid electrolyte. The heater part 70 includes a heater electrode 71, a heater 72, a heater lead 76, a through hole 73, a heater insulating layer 74, and a pressure relief vent 75.

The heater electrode 71 is an electrode formed in contact with the lower surface of the first substrate layer 1. The power can be supplied to the heater part 70 from the outside by connecting the heater electrode 71 with a heater power supply 77 that is an external power supply.

The heater 72 is an electrical resistor sandwiched by the second substrate layer 2 and the third substrate layer 3 from top and bottom. The heater 72 is connected with the heater electrode 71 via a heater lead 76 that connects with the heater 72 and extends in the rear end side in the longitudinal direction of the sensor element 101, and the through hole 73. The heater 72 is externally powered through the heater electrode 71 to generate heat, and heats and maintains the temperature of the solid electrolyte forming the sensor element 101.

The heater 72 is embedded over the whole area from the first internal cavity 20 to the third internal cavity 61 so that the temperature of the entire sensor element 101 can be adjusted to such a temperature that activates the solid electrolyte. The temperature may be adjusted so that the main pump cell 21, the auxiliary pump cell 50, and the measurement pump cell 41 are operable. It is not necessary that the whole area is adjusted to the same temperature, but the sensor element 101 may have temperature distribution.

In the sensor element 101 of the present embodiment, the heater 72 is embedded in the base part 102, but this form is not limitative. The heater 72 may be disposed to heat the base part 102. That is, the heater 72 may heat the sensor element 101 to develop oxygen ion conductivity with which the main pump cell 21, the auxiliary pump cell 50, and the measurement pump cell 41 are operable. For example, the heater 72 may be embedded in the base part 102 as in the present embodiment. Alternatively, for example, the heater part 70 may be formed as a heater substrate that is separate from the base part 102, and may be disposed at a position adjacent to the base part 102.

The heater insulating layer 74 is formed of an insulator such as alumina on the upper and lower surfaces of the heater 72 and the heater lead 76. The heater insulating layer 74 is formed to ensure electrical insulation between the second substrate layer 2, and the heater 72 and the heater lead 76, and electrical insulation between the third substrate layer 3, and the heater 72 and the heater lead 76.

The pressure relief vent 75 extends through the third substrate layer 3 so that the heater insulating layer 74 and the reference gas introduction space 43 communicate with each other. The pressure relief vent 75 can mitigate an increase in internal pressure due to temperature rise in the heater insulating layer 74. The pressure relief vent 75 may be absent.

The above-described sensor element 101 is incorporated into the gas sensor 100 in such a form that the front end part of the sensor element 101 comes into contact with the measurement-object gas, and the rear end part of the sensor element 101 comes into contact with the reference gas.

(Control Unit)

The gas sensor 100 of this embodiment includes the sensor element 101 described above and the control unit 90 for controlling the sensor element 101. In the gas sensor 100, each of the electrodes 22, 23, 51, 44, and 42 of the sensor element 101 is electrically connected to the control unit 90 through a lead wire not shown. FIG. 2 is a block diagram showing electric connections between the control unit 90 and the respective pump cells 21, 50, and 41, the respective sensor cells 80, 81, 82, and 83, and the heater part 70 of the sensor element 101. The control unit 90 includes the above-described pulse power supply 24 as an example of the control power supply, the above-described variable power supplies 46 and 52, the heater power supply 77, and a control part 91. The control part 91 includes a drive control part 92, a concentration calculating part 93, and a setting part 94.

The control part 91 is realized by a general-purpose or dedicated computer, and functions as the drive control part 92, the concentration calculating part 93, and the setting part 94 are realized by a CPU, a memory or the like installed in the computer. It is to be noted that when NOx contained in exhaust gas from the engine of a car is a target gas to be measured by the gas sensor 100 and the sensor element 101 is attached to an exhaust gas path, some or all of the functions of the control unit 90 (especially, the control unit 91) may be realized by an electronic control unit (ECU) installed in the car.

The control part 91 is configured to acquire an electromotive force (V0, V1, V2, Vref) in each of the sensor cells 80, 81, 82, and 83, a pump current (Ip0, Ip1, Ip2) in each of the pump cells 21, 50, and 41, and a heater voltage Vh and a heater current 111 in the heater part 70 of the sensor element 101. Further, the control part 91 is configured to output control signals to the pulse power supply 24 as an example of the control power supply, the variable power supplies 52 and 46, and the heater power supply 77.

The drive control part 92 is configured to control the heater part 70, the main pump cell 21, the auxiliary pump cell 50, and the measurement pump cell 41 so that the gas sensor 100 can measure the concentration of the target gas to be measured (in this embodiment, NOx).

The drive control part 92 heats the heater 72, and maintains the temperature of the heater 72 at a desired temperature.

In order to heat the heater 72, known various control methods can be used. For example, the heater 72 may be heated by applying a certain voltage to the heater 72. The output of the heater power supply 77 may be controlled on the basis of the resistance value of the heater 72. Alternatively, the output of the heater power supply 77 may be controlled on the basis of at least one of resistance values in the main pump cell 21, the auxiliary pump cell 50, and the measurement pump cell 41.

For example, the drive control part 92 performs feedback control of a control signal output to the heater power supply 77 on the basis of a heater resistance value Rh (=Vh/Ih) calculated from the heater voltage Vh and the heater current Ih in the heater 72 so that the heater 72 reaches a target temperature.

The drive control part 92 activates the main pump cell 21 and the auxiliary pump cell 50 in conjunction with each other. Specifically, the drive control part 92 performs control to apply the repeatedly on-off controlled main pump current Ip0 in the main pump cell 21 so that the auxiliary pump current Ip1 flowing through the auxiliary pump cell 50 is at a predetermined target current value (referred to as a target current value $Ip1_{SET}$) and to apply the auxiliary pump current Ip1 in the auxiliary pump cell 50 so that the electromotive force V1 between the auxiliary pump electrode 51 and the reference electrode 42 is at a predetermined target voltage value (referred to as a target voltage value $V1_{SET}$).

Specifically, the drive control part 92 performs feedback control of the pump voltage Vp1 of the variable power supply 52 in the auxiliary pump cell 50 so that the electromotive force V1 in the oxygen-partial-pressure detection sensor cell 81 for auxiliary pump control is at the target voltage value $V1_{SET}$. The oxygen partial pressure in the atmosphere in the second internal cavity 40 is thereby controlled to be a low partial pressure that does not substantially affect measurement of NOx.

In addition to that, the drive control part 92 feed-back controls the main pump current Ip0 of the pulse power supply 24 of the main pump cell 21 based on the auxiliary pump current Ip1 in the auxiliary pump cell 50 so that the auxiliary pump current Ip1 is at a constant value (target current value $Ip1_{SET}$). The target current value $Ip1_{SET}$ can appropriately be determined by those skilled in the art, but may generally be in the range of 1 to 20 μA. That is, the main pump cell 21 is controlled so that the electromotive force V1 is at the target voltage value $V1_{SET}$ as a result of applying a constant auxiliary pump current Ip1 in the auxiliary pump cell 50. Therefore, in the main pump cell 21, the oxygen partial pressure (oxygen concentration) near the inner main pump electrode 22 is controlled to be a predetermined value. Further, as a result, the main pump current Ip0 in the main pump cell 21 changes depending on the concentration of oxygen in the measurement-object gas.

The drive control part 92 performs feedback control of the pump voltage Vp2 of the variable power supply 46 in the measurement pump cell 41 so that the electromotive force V2 detected in the oxygen-partial-pressure detection sensor cell 82 for measurement pump control is at a constant value (referred to as a target value $V2_{SET}$). In the measurement electrode 44, nitrogen oxide in the measurement-object gas is reduced ($2NO \rightarrow N_2 + O_2$) to generate oxygen. The drive control part 92 pumps the generated oxygen out by the measurement pump cell 41 so that the electromotive force V2 becomes the target value $V2_{SET}$. The target value $V2_{SET}$ can be set as a value such that substantially all of NOx is decomposed at the measurement electrode 44. By setting the target value $V2_{SET}$ in this way, substantially all of NOx in the measurement-object gas is detected as a measurement pump current Ip2 in the measurement pump cell 41. To be precise, the measurement pump current Ip2 includes electric current generated by low concentration of oxygen after control by the main pump cell 21 and the auxiliary pump cell 50, and electric current generated by oxygen derived from NOx in the measurement-object gas. By maintaining the oxygen concentration in the measurement-object gas reaching the measurement electrode 44 at a constant level as described above, oxygen derived from NOx in the measurement-object gas can precisely be measured by the measurement pump current Ip2. As a result, the measurement pump current Ip2 can be detected as a current value corresponding to the concentration of NOx.

It is to be noted that the target current value Ip1 SET is stored as a set current value (a control current value) in a memory of the control part 91 which functions as the drive control part 92. The target voltage value $V1_{SET}$ and the target value $V2_{SET}$ is stored as set voltage values (control voltage values) in the memory of the control part 91 which functions as the drive control part 92. On the basis of these control values, a CPU of the control part 91 which functions as the drive control part 92 performs the driving control of the gas sensor 100.

The concentration calculating part 93 is configured to calculate and output a NOx concentration in a measurement-object gas.

The concentration calculating part 93 acquires the measurement pump current Ip2 in the measurement pump cell 41, calculates the NOx concentration in a measurement-object gas on the basis of a previously-stored conversion parameter (current-concentration conversion parameter) between the measurement pump current Ip2 and the NOx concentration in the measurement-object gas, and outputs the NOx concentration as a measurement value of the gas sensor 100. The current-concentration conversion parameter is previously stored in the memory of the control part 91 which functions as the concentration calculating part 93. The current-concentration conversion parameter may appropriately be determined by those skilled in the art by, for example, previously performing an experiment on the gas sensor 100. The current-concentration conversion parameter may be, for example, the coefficient of an approximate expression (e.g., linear function) obtained by experiment or a map showing the relationship between the measurement pump current Ip2 and the NOx concentration in a measurement-object gas. The current-concentration conversion parameter may be specific to each individual gas sensor 100 or may be common to a plurality of gas sensors.

The setting part 94 obtains the electric potential difference V0 generated between the inner main pump electrode 22 and the reference electrode 42, and sets the target voltage value $V1_{SET}$ in the auxiliary pump cell 50 based on the electric potential difference V0. The setting part 94 obtains the electric potential difference V0 between the inner main pump electrode 22 and the reference electrode 42 in the oxygen-partial-pressure detection sensor cell 80 for main pump control, and calculates, based on the value of the obtained electric potential difference V0, the target voltage value $V1_{SET}$ of the electromotive force V1 in the oxygen-partial-pressure detection sensor cell 81 for auxiliary pump control used in the above-described drive control part 92. The setting part 94 sets the calculated target voltage value $V1_{SET}$ as a set voltage value (control voltage value) in the drive control part 92. The drive control part 92 performs the above-described control based on the target voltage value $V1_{SET}$ set by the setting part 94.

The target voltage value $V1_{SET}$ is set to a value such that the concentration of oxygen near the auxiliary pump electrode 51, that is, the concentration of residual oxygen in the measurement-object gas that reaches the measurement electrode 44 is at a predetermined value. As described above, the drive control part 92 controls the main pump cell 21 and the auxiliary pump cell 50 in conjunction with each other. As a result, the concentration of oxygen near the inner main pump electrode 22 is controlled to be constant by the drive control part 92. That is, when the target voltage value $V1_{SET}$ is set to a value such that the concentration of residual oxygen in the measurement-object gas that reaches the measurement electrode 44 is at a predetermined value, the concentration of oxygen near the inner main pump electrode 22 resultantly becomes constant. Therefore, the target voltage value $V1_{SET}$ can be calculated based on the electric potential difference V0 between the inner main pump electrode 22 and the reference electrode 42 generated depending on the concentration of oxygen near the inner main pump electrode 22.

Specifically, the target voltage value $V1_{SET}$ is calculated based on the obtained electric potential difference V0 and a target value calculation parameter previously stored in the memory of the control part 91 that functions as the setting part 94. The target value calculation parameter is, for example, a parameter indicating the relationship between the electric potential difference V0, the amount of a temporal change in the electric potential difference V0, or a deviation from the target value of the electric potential difference V0 (i.e., a deviation from the target value of the concentration of oxygen near the inner main pump electrode 22) and the value or change amount of the target voltage value $V1_{SET}$. The target value calculation parameter can appropriately be determined by those skilled in the art by, for example, previously performing an experiment on the gas sensor 100. The target value calculation parameter may be, for example, a relational expression or map obtained from an experimentally-determined relationship between the concentration of oxygen near the inner main pump electrode 22 and the electric potential difference V0 or between the oxygen concentration of the auxiliary pump electrode 51 and the electromotive force V1.

[Detection of Concentration of Target Gas to be Measured]

Next, a method for using the gas sensor 100 having such a structure will be described. A detection method will be described in which the concentration of the target gas to be measured in the measurement-object gas is measured by controlling the gas sensor 100.

A control method of the gas sensor of the present embodiment includes:

a setting step of obtaining an electric potential difference generated between the inner main pump electrode and the reference electrode, and setting a target voltage value of an electromotive force between the inner auxiliary pump electrode and the reference electrode in the auxiliary pump cell based on the electric potential difference; and an oxygen concentration adjusting step of controlling the control power supply to apply a repeatedly on-off controlled main pump current in the main pump cell so that an auxiliary pump current flowing through the auxiliary pump cell is at a predetermined target current value, and applying the auxiliary pump current in the auxiliary pump cell so that an electromotive force between the inner auxiliary pump electrode and the reference electrode is at the target voltage value.

Figure 3:
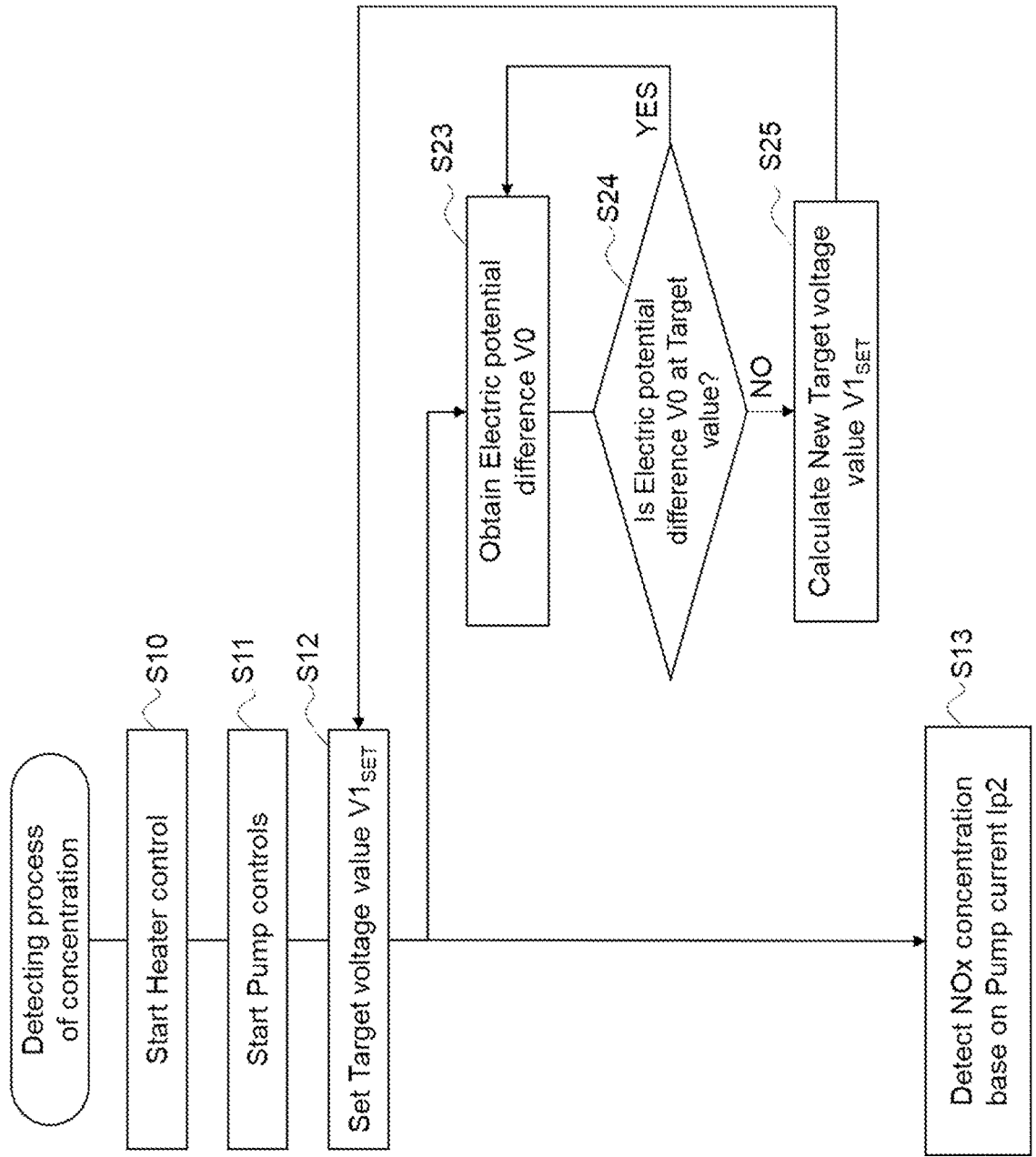
FIG. 3 is a flow chart showing one example of detecting process of NOx concentration in the gas sensor 100.

FIG. 3 is a flow chart showing one example of detecting process of NOx concentration in the gas sensor 100.

The detecting process of NOx concentration is started when, for example, the gas sensor 100 receives a start signal (Dew point). When the gas sensor 100 is installed in a car or the like, the start signal (Dew point) is, for example, a signal sent from an ECU, an exhaust gas treatment system, or the like of the car to the gas sensor 100. The detecting process of NOx concentration may be started by, for example, manually turning on the power supply of the control unit 90.

When the detecting process of NOx concentration is started, the drive control part 92 of the control part 91 starts to heat the heater 72 by the application of power to the heater 72 (step S10), and the sensor element 101 is maintained at a driving temperature (e.g., about 800° C.) at which the concentration of NOx is measured with high accuracy due to the activation of the solid electrolyte.

Next, the drive control part 92 starts pump controls for the main pump cell 21, the auxiliary pump cell 50, and the measurement pump cell 41 (step S11). Specifically, the drive control part 92 starts an oxygen concentration adjusting step in which the drive control part 92 feedback controls the pulse power supply 24 that is the control power supply to apply the repeatedly on-off controlled main pump current Ip0 in the main pump cell 21 so that the auxiliary pump current Ip1 flowing through the auxiliary pump cell 50 is at a predetermined target current value Ip1$_{SET}$, and feedback controls the variable power supply 52 to apply the auxiliary pump current Ip1 in the auxiliary pump cell 50 so that the electromotive force V1 between the auxiliary pump electrode 51 and the reference electrode 42 is at the target voltage value V1$_{SET}$. Further, the drive control part 92 starts control of feedback controlling the variable power supply 46 to apply the measurement pump current Ip2 in the measurement pump cell 41 so that the electromotive force V2 between the measurement electrode 44 and the reference electrode 42 is at the target value V2$_{SET}$.

The pump controls of the main pump cell 21, the auxiliary pump cell 50, and the measurement pump cell 41 may all be started at the same time, or the pump control of at least one of the pump cells may be started at a timing different from the pump controls of the other pump cells. The pump controls of all the pump cells may be started at timings different from one another. The step S11 may be performed after the sensor element 101 reaches the driving temperature or may be performed at a temperature lower than the driving temperature.

Then, the setting part 94 sets a predetermined target voltage value V1$_{SET}$ as a target voltage value V1$_{SET}$ in the drive control part 92 (Step S12). At the start of driving of the gas sensor 100, a previously-determined target voltage value V1$_{SET}$ may be set. When the drive control part 92 has a target voltage value V1$_{SET}$ as an initial value, the next step may be performed without performing the step S12 at the start of driving of the gas sensor 100. The target voltage value V1$_{SET}$ can appropriately be determined by those skilled in the art as a value such that the concentration of oxygen in the measurement-object gas that reaches the measurement electrode 44 is at a level that does not affect the measurement of NOx.

In a state where the step S11 and the step S12 are performed and the pump controls are continuously performed, the measurement-object gas passes through the gas inlet 10, the first diffusion-rate limiting part 11, the buffer space 12, and the second diffusion-rate limiting part 13 in this order and reaches the first internal cavity 20, and the oxygen concentration is adjusted to a concentration to be adopted in the auxiliary pump cell 50, that is, a concentration to be introduced in the second internal cavity 40 by the action of the main pump cell 21. Then, the measurement-object gas passes through the third diffusion-rate limiting part 30 and reaches the second internal cavity 40, and the oxygen concentration is further adjusted to a concentration to be adopted in the measurement pump cell 41, that is, a concentration to be introduced in the third internal cavity 61 by the action of the auxiliary pump cell 50. The measurement-object gas whose oxygen concentration has been adjusted to a constant low level by the main pump cell 21 and the auxiliary pump cell 50 passes through the fourth diffusion-rate limiting part 60 and reaches the third internal cavity 61. NOx in the measurement-object gas that has reached the third internal cavity 61 is decomposed at the measurement electrode 44, and the measurement pump current Ip2 is applied in the measurement pump cell 41 depending on the amount of oxygen generated by the decomposition of NOx.

Next, the concentration calculating part 93 obtains the measurement pump current Ip2 in the measurement pump cell 41, calculates the concentration of NOx in the measurement-object gas based on the obtained measurement pump current Ip2 and the previously-stored conversion parameter (current-concentration conversion parameter) between the measurement pump current Ip2 and the NOx concentration in the measurement-object gas, and outputs a detected value of the NOx concentration in the measurement-object gas as a measurement value of the gas sensor 100 (Step S13). The NOx concentration detected value is output as a measurement result of the gas sensor 100. The step S13 is performed continuously or at a timing of output of the gas sensor when the gas sensor 100 performs measurement.

In parallel with the step S13, that is, in parallel with the detection of the NOx concentration by the gas sensor 100, the setting part 94 performs the setting step in which an electric potential difference V0 generated between the inner main pump electrode 22 and the reference electrode 42 is obtained and a target voltage value V1$_{SET}$ of an electromotive force V1 between the auxiliary pump electrode 51 and the reference electrode 42 in the auxiliary pump cell 50 is set based on the electric potential difference V0 (Steps S13 and S23 to S25).

In this embodiment, the setting part 94 obtains the electric potential difference V0 in the oxygen-partial-pressure detection sensor cell 80 for main pump control (Step S23). The setting part 94 determines whether or not the obtained electric potential difference V0 is at a previously-determined target value (Step S24). When the electric potential difference V0 is at a previously-determined target value, the setting part 94 continues to set the target voltage value V1$_{SET}$ at the time of obtaining the electric potential difference V0 as a control voltage value in the drive control part 92. The drive control part 92 continues the pump control in a state where the target voltage value V1$_{SET}$ at the time of obtaining the electric potential difference V0 is kept. In this case, the step S23 is again performed so that the setting part 94 obtains the electric potential difference V0 in the oxygen-partial-pressure detection sensor cell 80 for main pump control.

When the electric potential difference V0 deviates from the previously-determined target value, the setting part 94 calculates a new target voltage value V1$_{SET}$ based on the value of the electric potential difference V0 or the value of a deviation from the target value of the electric potential difference V0 and the target value calculation parameter previously stored in the memory of the control part 91 that functions as the setting part 94 (Step S25). The setting part 94 sets the calculated new target voltage value $V1_{SET}$ as a control voltage value in the drive control part 92 (Step S12), and the step S13 and the step S23 and the subsequent steps are performed. By setting the new target voltage value $V1_{SET}$, the main pump cell 21 and the auxiliary pump cell 50 are controlled so that the electric potential difference V0 is at the target value.

By performing the above-described setting step in which the setting part 94 sets a target voltage value $V1_{SET}$ based on the electric potential difference V0, the concentration of oxygen near the auxiliary pump electrode 51 can more accurately be controlled. As a result, even when the concentration of NOx in the measurement-object gas is low, the NOx concentration can accurately be measured.

The setting part 94 performs the setting step in parallel in a state where the drive control part 92 performs the pump controls and the concentration calculating part 93 outputs a detected value of the NOx concentration in the measurement-object gas. Therefore, the concentration of oxygen near the auxiliary pump electrode 51, that is, the concentration of oxygen in the measurement-object gas that reaches the measurement electrode 44 can more accurately be controlled while the gas sensor 100 continues to measure the target gas to be measured (in this embodiment, NOx) in the measurement-object gas. As a result, the NOx concentration can continuously and accurately be measured even when the NOx concentration in the measurement-object gas is low.

Here, the target voltage value $V1_{SET}$ and the electric potential difference V0 will be described in detail.

Between the auxiliary pump electrode 51 and the reference electrode 42, an electromotive force is generated due to the difference in oxygen concentration between the auxiliary pump electrode 51 and the reference electrode 42. The reference electrode 42 is in contact with the reference gas (in this embodiment, the air), and therefore the concentration of oxygen near the reference electrode 42 can be considered to be always constant. Therefore, the electromotive force generated due to the difference in oxygen concentration between the auxiliary pump electrode 51 and the reference electrode 42 is considered to be a value indicating the partial pressure of oxygen near the auxiliary pump electrode 51.

For example, in the conventional gas sensor disclosed in WO 2020/196653 A1, the partial pressure of oxygen near the auxiliary pump electrode is controlled to be low by keeping the electromotive force between the auxiliary pump electrode and the reference electrode constant so that the oxygen partial pressure in a measurement-object gas is controlled to such a low level that does not substantially affect the measurement of NOx. As such, it is disclosed that the measurement-object gas whose oxygen concentration has been controlled to be low in such a manner reaches the measurement electrode, and a measurement pump current depending on the NOx concentration is detected in the measurement pump cell.

However, when the target gas to be measured is at a concentration as low as about 10 to 500 ppm, there is a case where a measured value (that is, the detected measurement pump current Ip2) varies. As a result of studies by the present inventors, it has been revealed that there is a case where the amount of oxygen (residual oxygen) in the measurement-object gas that reaches the measurement electrode 44 varies for some reason during the driving of the measurement-object gas gas sensor so that a value of the measurement pump current Ip2 detected in the measurement pump cell 41 varies. When the amount of residual oxygen in the measurement-object gas that reaches the measurement electrode 44 varies, a value of the measurement pump current Ip2 detected in the measurement pump cell 41 varies (shifts) irrespective of the NOx concentration in the measurement-object gas. It has been found that this may affect measurement accuracy particularly when the concentration of the target gas to be measured (in this embodiment, NOx) in the measurement-object gas is low.

When the concentration of residual oxygen in the measurement-object gas that reaches the measurement electrode 44 after the oxygen concentration thereof is controlled to be low by the main pump cell 21 and the auxiliary pump cell 50 is constant, an electric current resulting from the residual oxygen in the measurement pump current Ip2 is constant. Therefore, the measurement pump current Ip2 is a value that varies depending on the amount of oxygen generated by reduction of NOx at the measurement electrode 44. That is, there is an almost linear correlation between the measurement pump current Ip2 and the NOx concentration in the measurement-object gas. As a result, in the measurement pump cell 41, the measurement pump current Ip2 depending on the NOx concentration can be detected and the NOx concentration can accurately be measured.

When the concentration of residual oxygen in the measurement-object gas that reaches the measurement electrode 44 changes, the change $\Delta O_2$ in the concentration of residual oxygen appears as a shift of the value of the measurement pump current Ip2 flowing through the measurement pump cell 41 irrespective of the NOx concentration.

When a measurement-object gas containing a high concentration of NOx is measured, the measurement pump current Ip2 detected in the measurement pump cell 41 is relatively large, and therefore a shift of the measurement pump current Ip2 due to a change $\Delta O_2$ in the concentration of residual oxygen is relatively small. Therefore, high measurement accuracy is considered to be maintained. On the other hand, when a measurement-object gas containing a low concentration of NOx is measured, the measurement pump current Ip2 detected in the measurement pump cell 41 is relatively small, and therefore a shift of the measurement pump current Ip2 due to a change $\Delta O_2$ in the concentration of residual oxygen is relatively large, which tends to increase a influence on measurement accuracy.

The measurement pump current Ip2 includes an electric current resulting from residual oxygen in the measurement-object gas that reaches the measurement electrode 44 and an electric current resulting from oxygen derived from NOx in the measurement-object gas and generated at the measurement electrode 44. However, the electric current resulting from residual oxygen and the electric current resulting from oxygen derived from NOx cannot separately be measured. Therefore, particularly when a measurement-object gas containing a low concentration of NOx is measured, it is important to make a change $\Delta O_2$ in the concentration of residual oxygen sufficiently small, that is, to keep the concentration of residual oxygen constant. By keeping the concentration of residual oxygen constant, it is possible to accurately detect oxygen derived from NOx in the measurement-object gas in the measurement pump cell 41.

The present inventors have further studied the cause of a change $\Delta O_2$ in the concentration of residual oxygen in the measurement-object gas that reaches the measurement electrode44 and have found that, in a state where the gas sensor 100 is driven, the electromotive force V1 between the auxiliary pump electrode 51 and the reference electrode 42 includes not only the electromotive force generated by the difference in oxygen concentration between the auxiliary pump electrode 51 and the reference electrode 42 but also other factors.

According to the study by the present inventors, the electromotive force V1 is considered to include
(1) a concentration difference electromotive force V(oxygen) generated by the difference in oxygen concentration between the auxiliary pump electrode 51 and the reference electrode 42,
(2) a thermal electromotive force V(thermal) generated by the difference in temperature between the auxiliary pump electrode 51 and the reference electrode 42, and
(3) an electric potential difference generated by application of the auxiliary pump current Ip1 to the auxiliary pump electrode 51, that is, an electric potential difference V(IR) generated by the auxiliary pump current Ip1 and the resistance value of the auxiliary pump electrode 51. Further, for example, when a reference gas atmosphere near the reference electrode 42 is controlled by pumping oxygen into the reference electrode 42, an electric current flows also through the reference electrode 42. In this case, the electromotive force V1 is considered to further include, in addition to the above, an electric potential difference V(IR)' generated by the electric current flowing through the reference electrode 42 and the resistance value of the reference electrode 42.

In order to keep the partial pressure of oxygen near the auxiliary pump electrode 51 constant, the (1) concentration difference electromotive force V(oxygen) should be made constant. When the (2) thermal electromotive force V(thermal) and the (3) electric potential difference V(IR) are constant, keeping the electromotive force V1 constant is to keep the (1) concentration difference electromotive force V(oxygen) constant.

However, when at least one of the (2) thermal electromotive force V(thermal) and the (3) electric potential difference V(IR) varies for some reason, the (1) concentration difference electromotive force V(oxygen) may vary even when the electromotive force V1 is controlled to be constant. As a result, there is a fear that the partial pressure of oxygen near the auxiliary pump electrode 51 varies. The (2) thermal electromotive force V(thermal) and the (3) electric potential difference V(IR) may vary due to, for example, a change in the temperature of the measurement-object gas or a change in the flow rate or flow velocity of the measurement-object gas. Further, the resistance value of each of the auxiliary pump electrode 51 and the reference electrode 42 may change (usually increase) with time during the use of the gas sensor. Also in such a case where the resistance values of the electrodes change, the (2) thermal electromotive force V(thermal) and the (3) electric potential difference V(IR) may vary.

For example, when the proportion of the (2) thermal electromotive force V(thermal) and the (3) electric potential difference V(IR) in the electromotive force V1 increases, the (1) concentration difference electromotive force V(oxygen) that should be controlled to be constant relatively decreases. When the electromotive force V1 is controlled at a constant value in such a state, the concentration of oxygen near the auxiliary pump electrode 51 is controlled to be higher than a target oxygen concentration. That is, the concentration of residual oxygen in the measurement-object gas that reaches the measurement electrode 44 is controlled to be higher.

On the other hand, when the proportion of the (2) thermal electromotive force V(thermal) and the (3) electric potential difference V(IR) in the electromotive force V1 decreases, the (1) concentration difference electromotive force V(oxygen) that should be controlled to be constant relatively increases. When the electromotive force V1 is controlled at a constant value in such a state, the concentration of oxygen near the auxiliary pump electrode 51 is controlled to be lower than a target oxygen concentration. That is, the concentration of residual oxygen in the measurement-object gas that reaches the measurement electrode 44 is controlled to be lower.

As described above, the change $\Delta O_2$ in the concentration of residual oxygen is considered to be influenced by the change in the proportion of the (2) thermal electromotive force V(thermal) and the (3) electric potential difference V(IR) in the electromotive force V1.

The (2) thermal electromotive force V(thermal) can be determined by, for example, measuring the electromotive force V1 generated between the auxiliary pump electrode 51 and the reference electrode 42 in a state where the gas sensor 100 is driven in an air atmosphere and the pump controls of the main pump cell 21, the auxiliary pump cell 50, and the measurement pump cell 41 are all turned off.

As described above, the (3) electric potential difference V(IR) is generated depending on the auxiliary pump current Ip1 and the resistance value of the auxiliary pump electrode 51. The resistance value of the auxiliary pump electrode 51 can be calculated from, for example, the electromotive force V1 generated by applying a constant auxiliary pump current Ip1 in the auxiliary pump cell 50 in a state where the gas sensor 100 is driven in an air atmosphere and the pump controls of the main pump cell 21, the auxiliary pump cell 50, and the measurement pump cell 41 are all turned off.

As such, the (2) thermal electromotive force V(thermal) and the (3) electric potential difference V(IR) are obtained in a state where the pump controls are not performed, and therefore it is difficult to determine them in a state where the NOx concentration is detected by driving the gas sensor 100.

As described above, the controls of the main pump cell 21 and the auxiliary pump cell 50 are performed in conjunction with each other. Specifically, the drive control part 92 applies the auxiliary pump current Ip1 in the auxiliary pump cell 50 so that the electromotive force V1 between the auxiliary pump electrode 51 and the reference electrode 42 is at the target voltage value $V1_{SET}$. In addition to that, the drive control part 92 feed-back controls the main pump current Ip0 of the pulse power supply 24 of the main pump cell 21 based on the auxiliary pump current Ip1 in the auxiliary pump cell 50 so that the auxiliary pump current Ip1 is at the target current value $Ip1_{SET}$. That is, the main pump cell 21 is controlled so that the electromotive force V1 is at the target voltage value $V1_{SET}$ as a result of applying a constant auxiliary pump current Ip1 in the auxiliary pump cell 50. As a result, the oxygen concentration near the inner main pump electrode 22 is a concentration depending on the oxygen concentration near the auxiliary pump electrode 51.

Therefore, when a change $\Delta O_2$ in the concentration of oxygen near the auxiliary pump electrode 51, that is, the concentration of residual oxygen in the measurement-object gas that reaches the measurement electrode 44 occurs, a change in the concentration of oxygen near the inner main pump electrode 22 also occurs. As described above, the concentration of oxygen near the inner main pump electrode 22 can be detected by the electric potential difference V0 between the inner main pump electrode 22 and the reference electrode 42 in the oxygen-partial-pressure detection sensor cell 80 for main pump control. Therefore, it has been found that a change $\Delta O_2$ in the concentration of residual oxygen in the measurement-object gas that reaches the measurement electrode 44 can be detected by a change in the electric potential difference V0 between the inner main pump electrode 22 and the reference electrode 42.

From this finding, it has been found that the change $\Delta O_2$ in the concentration of residual oxygen in the measurement-object gas that reaches the measurement electrode 44 can be corrected to be zero or substantially zero by allowing the setting part 94 to perform the setting step in which an electric potential difference V0 generated between the inner main pump electrode 22 and the reference electrode 42 is obtained and a target voltage value $V1_{SET}$ of an electromotive force V1 between the auxiliary pump electrode 51 and the reference electrode 42 in the auxiliary pump cell 50 is set based on the electric potential difference V0. The change $\Delta O_2$ in the concentration of residual oxygen of substantially zero indicates that the concentration of residual oxygen in the measurement-object gas that reaches the measurement electrode 44 is substantially constant, that is, the concentration of residual oxygen in the measurement-object gas that reaches the measurement electrode 44 is constant to the extent that it does not affect the measurement accuracy of the NOx concentration even in a low concentration range in which the current value of the measurement pump current Ip2 is relatively small. As just described, it has been found that the concentration of residual oxygen in the measurement-object gas that reaches the measurement electrode 44 can be controlled with higher accuracy by performing such a measurement step as described above. By keeping the concentration of residual oxygen constant with high accuracy, oxygen derived from NOx in the measurement-object gas can accurately be detected in the measurement pump cell 41. As a result, the concentration of NOx can be measured with high measurement accuracy even in a low concentration range.

As described above, the drive control part 92 allows the pulse power supply 24 to apply the repeatedly on-off controlled main pump current Ip0 in the main pump cell 21. The direction of the main pump current Ip0 to pump oxygen out of the first internal cavity 20 is defined as positive, and the direction of the main pump current Ip0 to pump oxygen into the first internal cavity 20 is defined as negative. The positive direction of the main pump current Ip0 is the direction of the arrow of the main pump current Ip0 in FIG. 1, that is, the direction in which an electric current flows from the inner main pump electrode 22 to the outer pump electrode 23 outside the sensor element 101.

Figure 4:
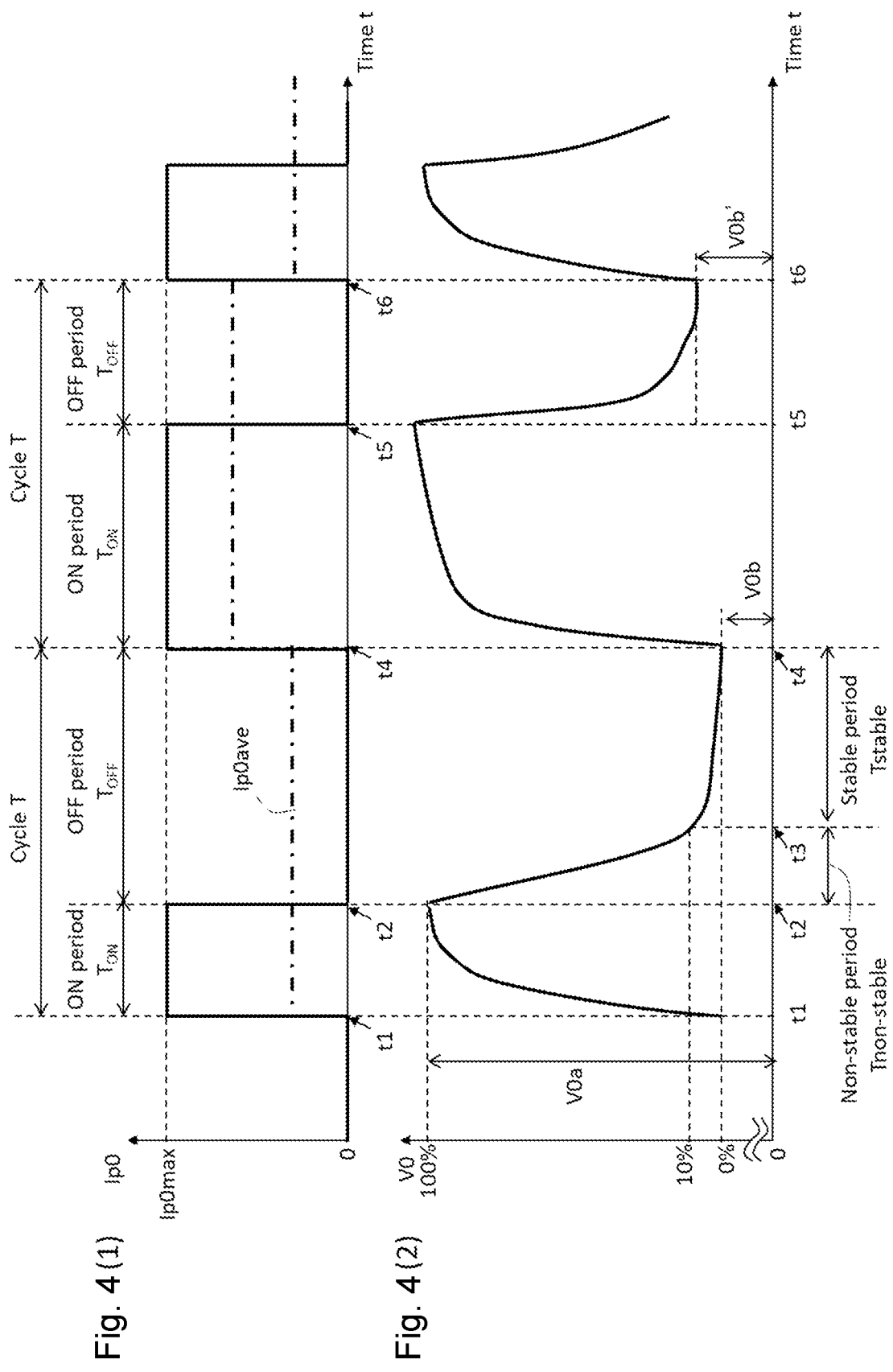
FIG. 4 is a graph schematically showing temporal changes in a main pump current Ip0 and an electric potential difference V0 when the main pump current Ip0 flows in the positive direction.

FIG. 4 is a graph schematically showing temporal changes in the main pump current Ip0 and the electric potential difference V0 when the oxygen pumps out of the first internal cavity 20, that is, when the main pump current Ip0 flows in the positive direction. FIG. 4(1) is a graph schematically showing a temporal change in the main pump current Ip0. The horizontal axis of the graph represents time t and the vertical axis of the graph represents the main pump current Ip0. The upward direction of the vertical axis is defined as the positive direction of the main pump current Ip0. FIG. 4(2) is a graph schematically showing a temporal change in the electric potential difference V0. The horizontal axis of the graph represents time t and the vertical axis of the graph represents the electric potential difference V0. With regard to the electric potential difference V0, a state where the electric potential of the reference electrode 42 is higher than that of the inner main pump electrode 22 is defined as positive. In FIG. 4(2), the upward direction of the vertical axis is defined as a positive direction. A value of the electric potential difference V0 is smaller as the oxygen concentration near the inner main pump electrode 22 is higher, and larger as the oxygen concentration near the inner main pump electrode 22 is lower.

In this embodiment, the main pump current Ip0 applied by the pulse power supply 24 in the main pump cell 21 is, as shown in FIG. 4(1), a pulse-wave electric current that is repeatedly on-off controlled in cycles T. For example, when the main pump current Ip0 is turned on at time t1 that is a start point of a certain cycle T, the main pump current Ip0 rises from 0 A to a maximum current Ip0max and maintains this state until time t2 at which an on period $T_{ON}$ elapses. When the main pump current Ip0 is turned off at time t2, the main pump current Ip0 falls from the maximum current Ip0max to 0 A and maintains 0 A until time t4 at which an off period $T_{OFF}$ elapses. Thus, a cycle T consists of an on-period $T_{ON}$ and a subsequent off period $T_{OFF}$. It is to be noted that, although the actual main pump current Ip0 requires a short time for rising from time t1 and for falling from time t2, the main pump current Ip0 is schematically illustrated as a rectangular wave in FIG. 4(1). Moreover, there may be a case where electric current slightly flows due to the effect of, for example, noise even in the off period $T_{OFF}$ in which the main pump current Ip0 output from the pulse power supply 24 is off. However, such a case is omitted in FIG. 4(1).

As described above, the drive control part 92 feed-back controls the main pump current Ip0 of the pulse power supply 24 of the main pump cell 21 based on the auxiliary pump current Ip1 in the auxiliary pump cell 50 so that the auxiliary pump current Ip1 is at a predetermined target value (target current value $Ip1_{SET}$). An amount of oxygen pumped out from the first internal cavity 20 during one cycle (i.e., cycle T) by the main pump current Ip0 in the main pump cell 21 is proportional to an average value Ip0ave (see a single-dot chain line in FIG. 4(1)) of the main pump current Ip0 during one cycle. Therefore, for example, the drive control part 92 varies the average value Ip0ave by outputting a control signal to the pulse power supply 24 to change at least one of parameters including a proportion (i.e., a duty ratio) of the on period $T_{ON}$ occupying the cycle T, the cycle T, and the maximum current Ip0max. The drive control part 92 may output the average value Ip0ave as a control signal to the pulse power supply 24, and the pulse power supply 24 may vary at least one of the aforementioned parameters based on the control signal. Alternatively, the drive control part 92 may output the auxiliary pump current Ip1 as a control signal to the pulse power supply 24, and the pulse power supply 24 may vary at least one of the aforementioned parameters based on the control signal. In this embodiment, the drive control part 92 outputs a duty ratio (or a variation of the duty ratio) as a control signal to the pulse power supply 24, and the pulse power supply 24 varies the duty ratio of the main pump current Ip0 based on the control signal. The duty ratio varies based on the control signal, but a maximum value of the duty ratio may be, for example, 90% or less. In this case, a minimum value of the ratio of the off period $T_{OFF}$ to the cycle T is 10% or more. The maximum value of the duty ratio may preferably be 80% or less. In this case, the minimum value of the ratio of the off period $T_{OFF}$ to the period T is 20% or more.

The cycle T of the intermittent main pump current Ip0 in FIG. 4(1) may be short to the extent that the actual oxygen concentration in the first internal cavity 20 during the cycle T is kept in an averagely-controlled state. In other words, the cycle T of the intermittent main pump current Ip0 may be short to the extent that a change in the actual oxygen concentration in the first internal cavity 20 between the on period $T_{ON}$ and the off period $T_{OFF}$ does not affect the adjustment of the oxygen concentration in the auxiliary pump cell 50. By setting the cycle T in such a manner, the actual oxygen concentration in the first internal cavity 20, that is, the oxygen concentration in the measurement-object gas to be introduced into the second internal cavity 40 can be controlled to be a predetermined concentration. The cycle T may be, for example, 0.1 s or shorter (i.e., a frequency of 10 Hz or higher), 0.02 s or shorter (i.e., a frequency of 50 Hz or higher), or 0.001 s or shorter (i.e., a frequency of 100 Hz or higher). In this embodiment, the cycle T is 0.0005 s (5 ms, i.e. a frequency of 200 Hz).

For example, in a case where the control unit 90 outputs the derived NOx concentration to another device, such as an engine ECU of a vehicle, at every predetermined cycle Tout, the cycle T is preferably shorter than or equal to one-tenth of the cycle Tout. By setting the cycle T in such a manner, the oxygen concentration in the measurement-object gas is controlled at the cycle T that is sufficiently short compared to the cycle Tout, so that the concentration of the target gas to be measured can be output more stably.

For example, when the auxiliary pump current Ip1 in the auxiliary pump cell 50 is larger than the target current value $Ip1_{SET}$, the drive control part 92 controls the pulse power supply 24 to increase the duty ratio of the main pump current Ip0 (to lengthen the on period $T_{ON}$ without changing the cycle T) so that the average value Ip0ave of the main pump current Ip0 increases and therefore the oxygen concentration in the first internal cavity 20 further decreases. FIG. 4(1) shows, as an example, a case where control is performed to double the length of the on period $T_{ON}$ (time t4 to t5) (i.e., double the duty ratio) in the second cycle T as compared to the length of the on period $T_{ON}$ (time t1 to t2) in the first cycle T. In this case, the average value Ip0ave in the second cycle T is twice the average value Ip0ave in the first cycle T. In the second cycle T, the average Ip0ave is twice, and therefore a larger amount of oxygen is pumped out of the first internal cavity 20 as compared to the period of the first cycle T. As a result, the concentration of oxygen near the inner main pump electrode 22 decreases in the second cycle T, and therefore as shown in FIG. 4(2), an electric potential difference V0b' at the end (time t6) of the second cycle T is larger than an electric potential difference V0b at the end (time t4) of the first cycle T.

Next, the electric potential difference V0 in the oxygen-partial-pressure detection sensor cell 80 for main pump control will be described in detail. The electric potential difference V0 in the oxygen-partial-pressure detection sensor cell 80 for main pump control is an electric potential difference between the inner main pump electrode 22 and the reference electrode 42. The electric potential difference V0 is mainly generated by the difference in oxygen concentration between the inner main pump electrode 22 and the reference electrode 42 and therefore depends on the concentration of oxygen in the first internal cavity 20 (near the inner main pump electrode 22). However, in the on period $T_{ON}$ in which the pulse power supply 24 applies the maximum current Ip0max, the electric potential of the inner main pump electrode 22 changes due to the application of the maximum current Ip0max. The amount of the electric potential change is virtually a value depending on the product of the maximum current Ip0max and the resistance value of the inner main pump electrode 22. As compared to the electric potential difference V0 in the on period $T_{ON}$, the electric potential difference V0 in the off period $T_{OFF}$ in which the pulse power supply 24 does not apply the main pump current Ip0 is a value more depending on the concentration of oxygen near the inner main pump electrode 22.

In terms of a more detailed change in the electric potential difference V0, the electric potential of the inner main pump electrode 22 also intermittently changes due to the application of the intermittent main pump current Ip0 by the pulse power supply 24. As a result, the electric potential difference V0 also cyclically varies depending on the change in the electric potential of the inner main pump electrode 22. As shown in FIG. 4(2), the electric potential difference V0 also cyclically and pulsatively varies in conjunction with the turning on and off of the main pump current Ip0 shown in FIG. 4(1).

For example, in FIG. 4(2), the electric potential difference V0 starts to change (starts to rise) at time t1 due to the influence of the electric potential caused by the application of the maximum pump current Ip0max. Then, the electric potential difference V0 becomes a most changed value V0a (maximum value) at time t2 due to the influence of the electric potential caused by the application of the maximum pump current Ip0max, and in the off period $T_{OFF}$ from time t2 in which the main pump current Ip0 does not flow, the influence of the electric potential due to the application of the maximum pump current Ip0max in the last on period $T_{ON}$ disappears and therefore the change starts to end (starts to fall). Then, the electric potential difference V0 becomes a most unchanged value V0b (minimum value) at time t4. The speed of rise or fall of the electric potential difference V0 is considered to depend on the electrostatic capacity (also referred to as electric capacity, or capacitance) of the inner main pump electrode 22 and the resistance value of the inner main pump electrode 22 (e.g., the product of the electrostatic capacity and the resistance value). In consideration of the speed of rise or fall of the electric potential difference V0, the proportion of the off period $T_{OFF}$ in the cycle T may be 10% or more (i.e., the duty ratio may be 90% or less). Preferably, the proportion of the off period $T_{OFF}$ in the cycle T may be 20% or more (i.e., the duty ratio may be 80% or less).

The off period $T_{OFF}$ of the main pump current Ip0 includes a non-stable period Tnon-stable from the start point of the off period $T_{OFF}$ until when a change in the electric potential difference V0 resulting from the main pump current Ip0 that was flowing in the last on period $T_{ON}$ calms down and the value of the electric potential difference V0 converges, and a stable period Tstable in which the electric potential difference V0 does not change due to the main pump current Ip0 that was flowing in the last on period $T_{ON}$. Here, the phrase "the electric potential difference V0 does not change due to the main pump current Ip0 that was flowing" implies that a change in the electric potential difference V0 is sufficiently small.

The stable period Tstable in which the electric potential difference V0 does not change due to the main pump current Ip0 that was flowing in the last on period $T_{ON}$ is defined as follows. The value V0b to the value V0a of the electric potential difference V0 in the period of one cycle T of the main pump current Ip0 is defined as 0% to 100%, and on the basis of this, the stable period Tstable of the electric potential difference V0 is set. Specifically, the stable period Tstable is defined as a time period from the time point at which the electric potential difference V0 is reduced to a predetermined percent due to the turning off of the main pump current Ip0 to the start point of the next cycle, that is, to the time point at which the electric potential difference V0 starts to rise (starts to increase) due to the turning on of the main pump current Ip0. The predetermined percent can appropriately be set by those skilled in the art. The predetermined percent may be, for example, 1% to 50%. For example, the predetermined percent may be 50% or less, 40% or less, 30% or less, 20% or less, 15% or less, 10% or less, 5% or less, or 1% or less. In this embodiment, the stable period Tstable is defined as a time period (time t3 to t4) from the time point at which the electric potential difference V0 is reduced to 10% or less due to the turning off of the main pump current Ip0 to the time point at which the electric potential difference V0 starts to rise due to the turning on of the main pump current Ip0 in the next period.

Alternatively, the stable period Tstable may be defined as a time period in which the electric potential difference V0 is equal to or less than the average value of the electric potential difference V0 in the off period $T_{OFF}$.

The non-stable period Tnon-stable is a time period from the start point of the off period $T_{OFF}$ until when a change in the electric potential difference V0 due to the main pump current Ip0 that was flowing in the last on period $T_{ON}$ ends and the value of the electric potential difference V0 converges. That is, the non-stable period Tnon-stable is a time period (time t2 to t3 in FIG. 4(2)) from the start point of the off period $T_{OFF}$ to the start point of the stable period Tstable in one cycle T.

The length of the stable period Tstable may vary depending on, for example, the length of the on period $T_{ON}$ (the magnitude of the duty ratio) in the cycle T.

In FIG. 4(2), the electric potential difference V0 becomes the most changed value V0a for the first time at time t2 at which the main pump current Ip0 is turned off, but when the on period $T_{ON}$ is long, there is a case where the electric potential difference V0 reaches the value V0a before time t2 and such a state continues to time t2. Further, the electric potential difference V0 becomes the most unchanged value V0b for the first time at time t4 at which the main pump current Ip0 is turned on in the next cycle, but there is a case where the electric potential difference V0 reaches the value V0b before time t4 and such a state continues to time t4.

In the stable period Tstable, the electric potential difference V0 does not change due to the main pump current Ip0 that was flowing in the last on period $T_{ON}$, that is, a change in the electric potential difference V0 is sufficiently small. Therefore, the electric potential difference V0 in the stable period Tstable is a value more accurately indicating the concentration of oxygen near the inner main pump electrode 22.

As just described, the electric potential difference V0 varies due to the influence of the main pump current Ip0. In the off period $T_{OFF}$ in which the pulse power supply 24 does not apply the main pump current Ip0, a change in the electric potential difference V0 due to the application of the main pump current Ip0 is small, and therefore the electric potential difference V0 indicates the concentration of oxygen near the inner main pump electrode 22. Further, in the stable period Tstable, the electric potential difference V0 does not change due to the main pump current Ip0 that was flowing in the last on period $T_{ON}$, that is, a change in the electric potential difference V0 is sufficiently small. Therefore, the electric potential difference V0 is a value more accurately indicating the concentration of oxygen near the inner main pump electrode 22.

As described above, in the step S23, the setting part 94 obtains the electric potential difference V0 in the oxygen-partial-pressure detection sensor cell 80 for main pump control. The timing at which the setting part 94 obtains the electric potential difference V0 can appropriately be determined, but the setting part 94 may preferably obtain the electric potential difference V0 between the inner main pump electrode 22 and the reference electrode 42 in the off period $T_{OFF}$ in which the main pump current Ip0 does not flow in the main pump cell 21. This makes it possible to obtain the electric potential difference V0 less influenced by the main pump current Ip0. That is, it is possible to obtain the electric potential difference V0 that indicates the concentration of oxygen near the inner main pump electrode 22.

More preferably, the setting part 94 may obtain the electric potential difference V0 between the inner main pump electrode 22 and the reference electrode 42 in the stable period Tstable in which the main pump current Ip0 does not flow in the main pump cell 21 and the electric potential difference V0 does not change due to the main pump current Ip0 that was flowing. This makes it possible to obtain the electric potential difference V0 lesser influenced by the main pump current Ip0. That is, it is possible to obtain the electric potential difference V0 that indicates the concentration of oxygen near the inner main pump electrode 22 more accurately.

Further, as shown in FIG. 4(2), a change in the electric potential difference V0 due to the application of the main pump current Ip0 tends to be smaller toward the end point (time t4) of the stable period Tstable. Therefore, the setting part 94 may obtain the electric potential difference V0 between the inner main pump electrode 22 and the reference electrode 42 at, for example, any time point in the last half of the stable period Tstable.

Further, for example, the setting point 94 may obtain the electric potential difference V0 between the inner main pump electrode 22 and the reference electrode 42 at a predetermined time point included in the off period $T_{OFF}$ in which the main pump current ip0 does not flow in the main pump cell 21. The predetermined time point may be set as, for example, a time point a predetermined time before the end point of the off period $T_{OFF}$. The predetermined time point is more preferably a time point closer to the end point of the off period $T_{OFF}$. The predetermined time point may be set to be included in the stable period Tstable in which the electric potential difference V0 does not change due to the main pump current Ip0 that was flowing. For example, the predetermined time point may be set as follows. A temporal change in the electric potential difference V0 at the maximum duty ratio previously expected or set is experimentally determined, and any time point included in the stable period Tstable in the case of the maximum duty ratio is set as the predetermined time period. This makes it possible to obtain the electric potential difference V0 more accurately indicating the concentration of oxygen near the inner main pump electrode 22 without monitoring a temporal change in the electric potential difference V0.

Figure 5:
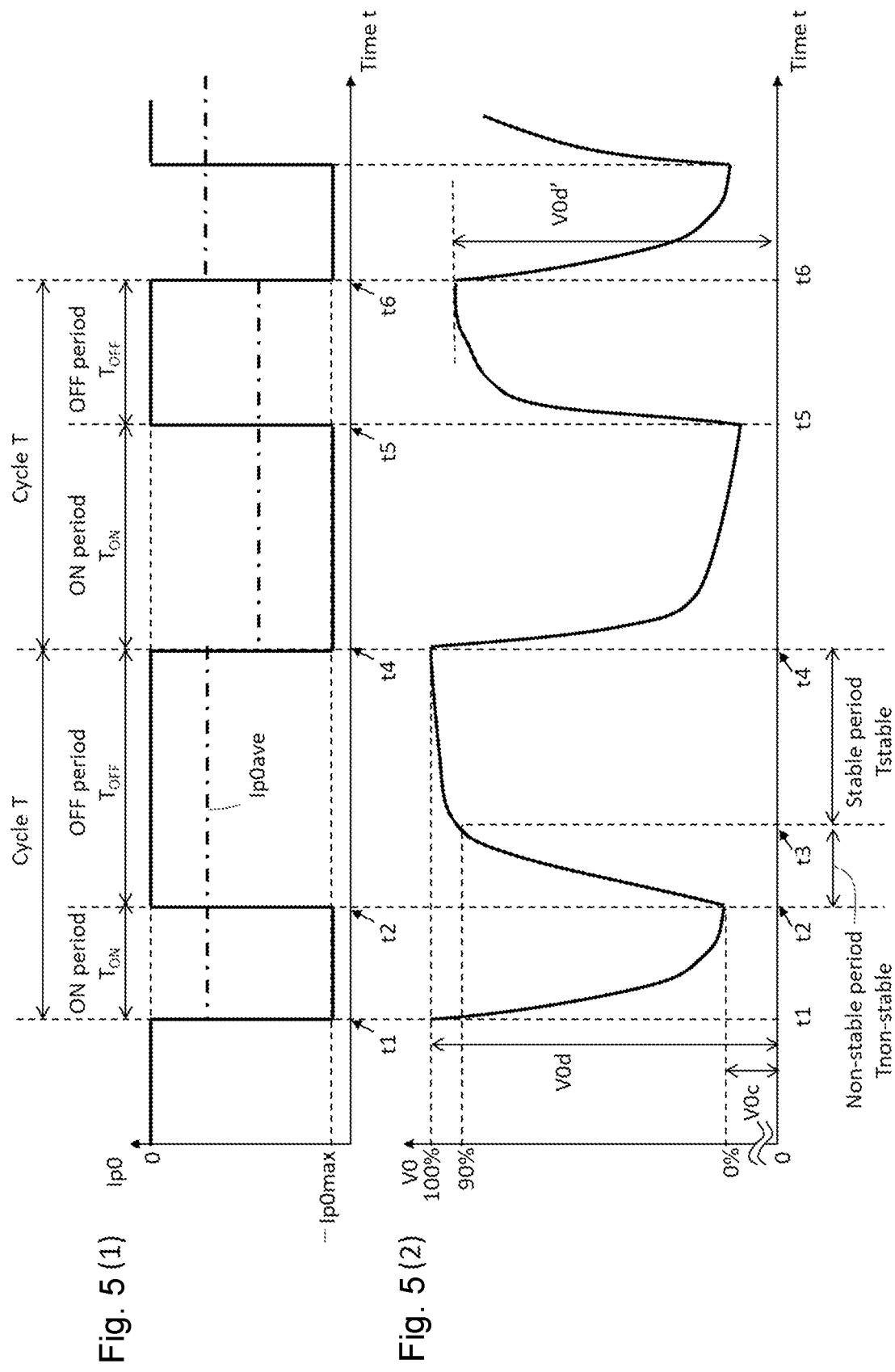
FIG. 5 is a graph schematically showing temporal changes in the main pump current Ip0 and the electric potential difference V0 when the main pump current Ip0 flows in the negative direction.

The above description has been made with reference to a case where oxygen is pumped out of the first internal cavity 20, that is, a case where the main pump current Ip0 flows in the positive direction. However, for example, when the concentration of oxygen contained in the measurement-object gas is very low or the measurement-object gas contains a large amount of hydrocarbon HC, there is a case where oxygen is pumped into the first internal cavity 20, that is, a case where the main pump current Ip0 flows in the negative direction. FIG. 5 is a graph schematically showing temporal changes in the main pump current Ip0 and the electric potential difference V0 when the main pump current Ip0 flows in the negative direction. FIG. 5(1) is a graph schematically showing a temporal change in the main pump current Ip0. The horizontal axis of the graph represents time t and the vertical axis of the graph represents the main pump current Ip0. As in FIG. 4(1), the upward direction of the vertical axis in FIG. 5(1) is defined as the positive direction of the main pump current Ip0. FIG. 5(2) is a graph schematically showing a temporal change in the electric potential difference V0. The horizontal axis of the graph represents time t and the vertical axis of the graph represents the electric potential difference V0. With regard to the electric potential difference V0, a state where the electric potential of the reference electrode 42 is higher than that of the inner main pump electrode 22 is defined as positive. In FIG. 5(2), as in FIG. 4(2), the upward direction of the vertical axis is defined as a positive direction.

In the case where the main pump current Ip0 flows in the negative direction, for example, when the main pump current Ip0 is turned on at time t1 that is a start point of a certain cycle T, the main pump current Ip0 goes from 0 A to a maximum current Ip0$max$ in the negative direction (minus maximum current Ip0$max$) and maintains this state until time t2 at which an on period $T_{ON}$ elapses. When the main pump current Ip0 is turned off at the time t2, the main pump current Ip0 goes from the minus maximum current Ip0$max$ to 0 A and maintains 0 A until time t4 at which an off period $T_{OFF}$ elapses. In this embodiment, a value of the maximum current Ip0$max$ flowing in the positive direction and an absolute value of the maximum current Ip0$max$ flowing in the negative direction (the minus maximum current Ip0$max$) is the same. However, the absolute values may be different in positive and negative directions.

Under the influence of the main pump current Ip0 which flows intermittently in the negative direction, the electric potential difference V0 also intermittently changes. For example, in FIG. 5(2), the electric potential difference V0 starts to change (starts to fall) at time t1 due to the influence of the electric potential caused by the application of the maximum current Ip0$max$ in the negative direction (minus maximum current Ip0$max$). Then, the electric potential difference V0 becomes a most changed value V0$c$ (minimum value) at time t2 due to the influence of the electric potential caused by the application of the maximum current Ip0$max$ in the negative direction (minus maximum current Ip0$max$), and in the off period $T_{OFF}$ from time t2 in which the main pump current Ip0 does not flow, the influence of the electric potential due to the application of the maximum current Ip0$max$ in the negative direction (minus maximum current Ip0$max$) in the last on period $T_{ON}$ disappears and therefore the change starts to end (starts to rise). Then, the electric potential difference V0 becomes a most unchanged value V0$d$ (maximum value) at time t4.

For example, when the auxiliary pump current Ip1 in the auxiliary pump cell 50 is larger than the target current value Ip1$_{SET}$, the drive control part 92 controls the pulse power supply 24 to decrease the duty ratio of the main pump current Ip0 in the negative direction or to apply the main pump current Ip0 in the positive direction so that the oxygen concentration in the first internal cavity 20 further decreases.

Further, for example, when the auxiliary pump current Ip1 in the auxiliary pump cell 50 is smaller than the target current value Ip1$_{SET}$, the drive control part 92 controls the pulse power supply 24 to increase the duty ratio of the main pump current Ip0 in the negative direction so that the oxygen concentration in the first internal cavity 20 further increases. FIG. 5(1) shows, as an example, a case where control is performed to double the length of the on period $T_{ON}$ (time t4 to t5) (i.e., double the duty ratio) in the second cycle T as compared to the length of the on period $T_{ON}$ (time t1 to t2) in the first cycle T. In this case, the average value Ip0$ave$ in the negative direction in the second cycle T is twice the average value Ip0$ave$ in the negative direction in the first cycle T. In the second cycle T, the average Ip0$ave$ in the negative direction is twice, and therefore a larger amount of oxygen is pumped into the first internal cavity 20 as compared to the period of the first cycle T. As a result, the concentration of oxygen near the inner main pump electrode 22 increases in the second cycle T, and therefore as shown in FIG. 5(2), an electric potential difference V0$d'$ at the end of the second cycle T is smaller than the electric potential difference V0$d$ at the end of the first cycle T.

Also in the case where the main pump current Ip0 flows in the negative direction, the value V0$c$ to the value V0$d$ of the electric potential difference V0 in the period of one cycle T of the main pump current Ip0 is defined as 0% to 100%, and on the basis of this, the non-stable period Tnon-stable and the stable period Tstable of the electric potential difference V0 in the off period $T_{OFF}$ is set. Specifically, the stable period Tstable is defined as a time period from the time point at which the electric potential difference V0 is increased to a predetermined percent due to the turning off of the main pump current Ip0 to the start point of the next cycle, that is, to the time point at which the electric potential difference V0 starts to fall (starts to decrease) due to the turning on of the main pump current Ip0. The predetermined percent can appropriately be set by those skilled in the art. The predetermined percent may be, for example, 50% to 99%. For example, the predetermined percent may be 50% or more, 60% or more, 70% or more, 80% or more, 85% or more, 90% or more, 95% or more, or 99% or more. In this embodiment, the stable period Tstable is defined as a time period (time t3 to t4) from the time point at which the electric potential difference V0 is increased to 90% or more due to the turning off of the main pump current Ip0 to the time point at which the electric potential difference V0 starts to fall due to the turning on of the main pump current Ip0 in the next period.

Alternatively, the stable period Tstable may be defined as a time period in which the electric potential difference V0 is equal to or more than the average value of the electric potential difference V0 in the off period $T_{OFF}$.

The non-stable period Tnon-stable is a time period from the start point of the off period $T_{OFF}$ until when a change in the electric potential difference V0 due to the main pump current Ip0 that was flowing in the last on period $T_{ON}$ ends and the value of the electric potential difference V0 converges. That is, the non-stable period Tnon-stable is a time period (time t2 to t3 in FIG. 5(2)) from the start point of the off period $T_{OFF}$ to the start point of the stable period Tstable in one cycle T.

The setting part 94 determines whether or not the electric potential difference V0 between the inner main pump electrode 22 and the reference electrode 42 is at a predetermined target value. When the electric potential difference V0 is at a target value, a change $\Delta O_2$ in the concentration of residual oxygen has not occurred, and therefore the target voltage value V1$_{SET}$ at the time of obtaining the electric potential difference V0 is continuously used. The phrase "the electric potential difference V0 is at a target value" implies that a deviation from the target value is within a predetermined range. The phrase "a deviation from the target value is within a predetermined range" implies that change $\Delta O_2$ in the concentration of residual oxygen does not substantially occur. When the electric potential difference V0 deviates from a target value, a change $\Delta O_2$ in the concentration of residual oxygen has occurred, and therefore the setting part 94 calculates a new target voltage value V1$_{SET}$ based on the value of the electric potential difference V0 or the value of a deviation from the target value of the electric potential difference V0. The phrase "the electric potential difference V0 deviates from a target value" implies that a deviation from the target value is outside a predetermined range.

The target value of the electric potential difference V0 can appropriately be determined by those skilled in the art. The target value may be set so that the concentration of oxygen near the auxiliary pump electrode 51, that is, the concentration of residual oxygen in the measurement-object gas that reaches the measurement electrode 44 is at a predetermined value as a result of applying a constant auxiliary pump current Ip1 in the auxiliary pump cell 50. The target value may be set to a value such that a change $\Delta O_2$ in the concentration of residual oxygen in the measurement-object gas that reaches the measurement electrode 44 is within a range acceptable to desired measurement accuracy of the concentration of NOx. For example, the target value of the electric potential difference V0 may be 150 mV to 300 mV in consideration of the variation range of concentration of residual oxygen in the measurement-object gas that reaches the measurement electrode 44 described later.

The predetermined range of the deviation from the target value can appropriately be determined by those skilled in the art. The predetermined range of the deviation from the target value may be determined based on the range of a change $\Delta O_2$ in the concentration of residual oxygen in the measurement-object gas that reaches the measurement electrode 44 which is acceptable to desired measurement accuracy of the concentration of NOx. Alternatively, the predetermined range of the deviation from the target value may be determined based on the degree of a slight change in control in the pump controls. For example, the deviation from the target value of the electric potential difference V0 may be 5 mV or less to 30 mV or less in consideration of the variation range of the concentration of residual oxygen in the measurement-object gas that reaches the measurement electrode 44 described later.

Alternatively, a target range of the electric potential difference V0 may previously be set. When the electric potential difference V0 between the inner main pump electrode 22 and the reference electrode 42 is within the target range, a change $\Delta O_2$ in the concentration of residual oxygen does not substantially have occurred, and therefore the target voltage value $V1_{SET}$ at the time of obtaining the electric potential difference V0 is continuously used. When the electric potential difference V0 deviates from the target range, a change $\Delta O_2$ in the concentration of residual oxygen has substantially occurred, and therefore the setting part 94 calculates a new target voltage value $V1_{SET}$ based on the value of the electric potential difference V0.

As just described, by performing the above-described setting step in which the target voltage value $V1_{SET}$ is set based on the electric potential difference V0, it is possible to prevent a change $\Delta O_2$ in the concentration of oxygen near the auxiliary pump electrode 51, that is, the concentration of residual oxygen in the measurement-object gas that reaches the measurement electrode 44 from substantially occurring. That is, it is possible to control the concentration of residual oxygen in the measurement-object gas that reaches the measurement electrode 44 to be constant. The target voltage value $V1_{SET}$ may result in a value of about 300 mV to 450 mV as a result of the setting step. The concentration of residual oxygen in the measurement-object gas that reaches the measurement electrode 44 may be maintained at a constant value of, for example, about 0.1 ppm or less, 0.01 ppm or less, 0.001 ppm or less, or 0.0001 ppm. The concentration of residual oxygen in the measurement-object gas that reaches the measurement electrode 44 may be maintained within a certain range (within a predetermined variation range) to the extent that the object of the present invention can be achieved, that is, the target gas to be measured (in this embodiment, NOx) with a concentration as low as about 10 to 500 ppm can be measured with high accuracy. The concentration of residual oxygen is preferably controlled within a range (variation range) as small as possible. When the concentration of residual oxygen in the measurement-object gas that reaches the measurement electrode 44 is controlled to be 0.001 ppm, the variation range of the concentration of residual oxygen may be, for example, 0.0001 ppm or less (1/10 or less) or 0.00005 ppm or less (1/20 or less). The variation range of the concentration of residual oxygen can appropriately be determined by those skilled in the art depending on the intended use of the gas sensor 100.

When the electric potential difference V0 deviates from a previously-determined target value, the setting part 94 calculates a new target voltage value $V1_{SET}$ based on the value of the electric potential difference V0 or the value of a deviation from the target value of the electric potential difference V0. The setting part 94 may calculate a new target voltage value $V1_{SET}$ based on the value of the electric potential difference V0 (e.g., a value in the stable period Tstable) obtained in each cycle T. Alternatively, the setting part 94 may calculate a new target voltage value $V1_{SET}$ based on the values of the electric potential difference V0 obtained in the respective cycles T (for example, based on the average of values of the electric potential difference V0 obtained in cycles different from each other). For example, when the setting part 94 calculates a new target voltage value $V1_{SET}$ based on only the electric potential difference V0 obtained in one cycle, there may be a case where the obtained electric potential difference V0 is different from a value indicating the concentration of oxygen near the inner main pump electrode 22 due to the instantaneous fluctuation of the electric potential difference V0 or electrical noise. In this case, the setting part 94 may excessively change the target voltage value $V1_{SET}$. If the target voltage value $V1_{SET}$ is excessively changed, there may be a case where the auxiliary pump current Ip1 applied in the auxiliary pump cell 50 and the main pump current Ip0 (average value Ip0ave) applied by the pulse power supply 24 in the main pump cell 21 excessively change so that unstable controls such as vibration and oscillation occur. On the other hand, when the setting part 94 calculates the target voltage value $V1_{SET}$ based on, for example the average of values of the electric potential difference V0 in the stable period Tstable obtained in two or more cycles, the target voltage value $V1_{SET}$ more reflecting the actual concentration of oxygen near the inner main pump electrode 22 is calculated so that control is more likely to be stabilized. In this embodiment, the electric potential difference V0 at a predetermined timing in the stable period Tstable in each cycle T is stored in the memory of the control part 91 that functions as the setting part 94, and the setting part 94 calculates the target voltage value $V1_{SET}$ based on the average of values of the electric potential difference V0 most recently stored two or more times (e.g., three times).

The gas sensor 100 for detecting NOx concentration in a measurement-object gas has been described above as an example of the embodiment according to the present invention, but the present invention is not limited thereto. The present invention may include a gas sensor having any structure including a sensor element and a control unit as long as the object of the present invention can be achieved, that is, the target gas to be measured is accurately measured in a wide concentration range including the low concentration of the target gas to be measured.

Figure 6:
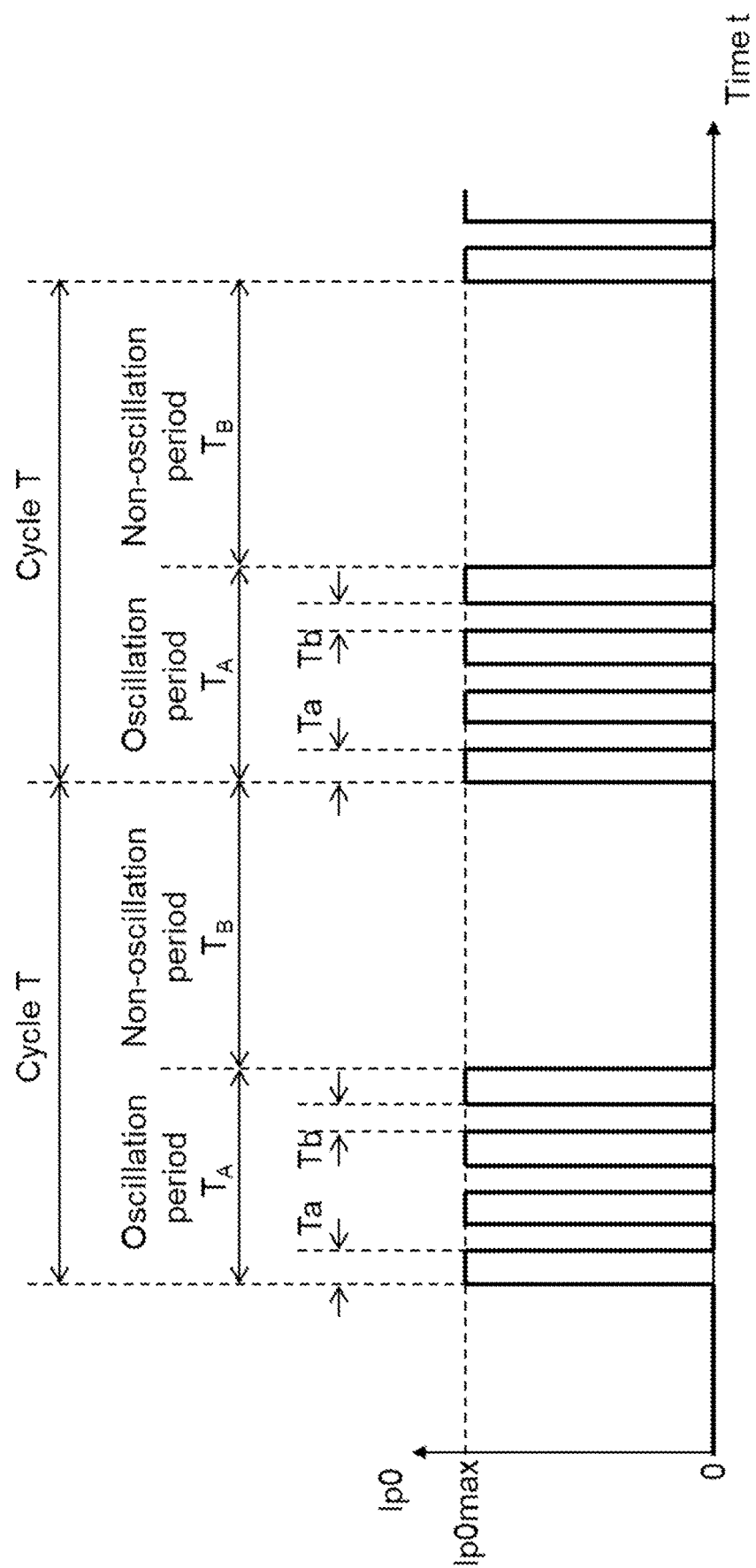
FIG. 6 is a graph schematically showing an example where the main pump current Ip0 is a burst pulse current. The horizontal axis of the graph represents time t and the vertical axis of the graph represents the main pump current Ip0.

In the above embodiment, the intermittent main pump current Ip0 is an electric current having one rectangular wave per cycle (i.e., a rectangular single pulse current) as shown in FIG. 4 (1), but the intermittent main pump current Ip0 is not limited thereto. For example, the pulse power supply 24 may use a burst pulse current, as shown in FIG. 6, as the intermittent main pump current Ip0. In this case, the drive control part 92 may vary the average value Ip0ave of the main pump current Ip0 during one cycle by outputting a control signal to the pulse power supply 24 to change at least one of parameters including the proportion (i.e., duty ratio) of an oscillation period TA occupying a cycle T (i.e., burst cycle), the cycle T, the number of pulses during one cycle (i.e., four pulses in FIG. 6), a time Ta of a single oscillation (i.e., pulse), a pulse cycle (Ta+Tb), and the maximum current Ip0max.

In the case where the main pump current Ip0 is a burst pulse current, as in FIG. 6, the change period Tchange of the electric potential difference V0 is included in the oscillation period $T_A$, and the stable period Tstable is included in a non-oscillation period $T_B$. More specifically, in the case where the main pump current Ip0 is a burst pulse current, the oscillation period $T_A$ is regarded as an on period (t1 to t2 in FIG. 4) of the main pump current Ip0, the non-oscillation period $T_B$ is regarded as an off period (t2 to t4 in FIG. 4) of the main pump current Ip0, and the stable period Tstable is defined based on a method similar to that in the above-described embodiment.

In the above embodiment and the above-described burst pulse current, the pulse power supply 24 applies a rectangular-wave pulse current as the main pump current Ip0 as shown in FIG. 4(1). However, the pulse current to be applied is not limited to a rectangular-wave (square-wave) pulse current and may have a sinusoidal half waveform, a triangular waveform, a saw-tooth waveform, or a waveform at the time of discharge, or may have a waveform obtained by combining one or more of these waveforms.

In FIG. 4(1), FIG. 5(1) and FIG. 6, a pulse current of the main pump current Ip0 is illustrated as a rectangular-wave pulse current. However, as described above, a pulse current requires a short period of time for rising and falling. Specifically, a pulse current actually has a rise time and a fall time, and the waveform of a pulse current is not a perfect rectangle. Therefore, for example, if the pulse width of the pulse current is too small [for example, if the time Ta of the single oscillation (i.e., pulse) in the burst pulse current is too short], the actual peak value of the pulse current may sometimes not reach the peak value of an ideal rectangular waveform due to the effect of the rise time. In this case, even if the drive control part 92 performs the above-described feedback control in the main pump cell 21, in which the auxiliary pump current Ip1 is at a constant value (target current value $Ip1_{SET}$) and outputs a control signal to the pulse power supply 24 so as to set the average value Ip0ave to a certain target value, the actual average value Ip0ave becomes smaller than the theoretical average value Ip0ave. Thus, the actual average value Ip0ave may deviate from the target value, and therefore the oxygen concentration in the measurement-object gas may not be accurately controlled. On the other hand, when the pulse width of the pulse current is large, the actual peak value of the pulse current reaches the peak value of the ideal rectangular waveform even with the existence of the rise time. In this case, a deviation between the actual average value Ip0ave and the target value is less likely to occur.

Therefore, the drive control part 92 preferably controls the main pump cell 21 so that the pulse width of the main pump current Ip0 is at a value such that the actual peak value reaches the peak value of an ideal rectangular wave form. That is, the drive control part 92 preferably controls the main pump current Ip0 so that the pulse width of the main pump current Ip0 is equal to or more than a predetermined lower limit.

In the above-described embodiment, the pulse power supply 24 is configured as a current supply, but a voltage supply may be used. The pulse power supply 24 may apply an intermittent voltage Vp0 between the inner main pump electrode 22 and the outer pump electrode 23 to apply an intermittent main pump current Ip0.

In the above-described embodiment, the setting part 94 is configured to appropriately change the target voltage value $V1_{SET}$ in the auxiliary pump cell 50 based on the value of the electric potential difference V0 or the value of a deviation from the target value of the electric potential difference V0, but in addition to the target voltage value $V1_{SET}$ in the auxiliary pump cell 50, the target current value $Ip1_{SET}$ may also be changed. For example, when the deviation from the target value of the electric potential difference V0 is large, the electric potential difference V0 can more quickly be controlled to be a target value by changing both the target voltage value $V1_{SET}$ and the target current value $Ip1_{SET}$.

In the above embodiment, the gas sensor 100 detects the NOx concentration in a measurement-object gas. However, the target gas to be measured is not limited to NOx. For example, the target gas to be measured may be an oxide gas other than NOx (e.g., carbon dioxide $CO_2$, water $H_2O$). When the target gas to be measured is an oxide gas, as in the case of the above embodiment in which the NOx concentration is detected, a measurement-object gas containing an oxide gas itself is introduced into the third internal cavity 61, and the oxide gas in the measurement-object gas is reduced at the measurement electrode 44 so that oxygen is generated. The target gas to be measured can be detected by acquiring the generated oxygen as the measurement pump current Ip2 in the measurement pump cell 41.

Alternatively, the target gas to be measured may be a non-oxide gas such as ammonia $NH_3$. When the target gas to be measured is a non-oxide gas, the non-oxide gas is converted to an oxide gas (for example, in the case of ammonia $NH_3$, $NH_3$ is converted to NO), and a measurement-object gas containing the converted oxide gas is introduced into the third internal cavity 61. At the measurement electrode 44, the converted oxide gas in the measurement-object gas is reduced so that oxygen is generated. The target gas to be measured can be detected by acquiring the generated oxygen as the measurement pump current Ip2 in the measurement pump cell 41. The conversion from the non-oxide gas to the oxide gas can be performed by allowing at least one of the inner main pump electrode 22 and the auxiliary pump electrode 51 to function as a catalyst.

In the above-described embodiment, the auxiliary pump cell 50 and the measurement pump cell 41 are controlled by allowing the variable power supplies 52 and 46 to apply a continuous current, but the control is not limited thereto. In addition to the main pump cell 21, at least one of the auxiliary pump cell 50 and the measurement pump cell 41 may be controlled by applying an intermittent pump current. For example, all the main pump cell 21, the auxiliary pump cell 50, and the measurement pump cell 41 may be controlled by applying an intermittent pump current. That is, a pulse power supply as a current supply may be used instead of the variable power supply 52 in the auxiliary pump cell 50, and a pulse power supply as a current supply may be used instead of the variable power supply 46 in the measurement pump cell 41. In this case, in the auxiliary pump cell 50, the auxiliary pump current Ip1 of the pulse power supply in the auxiliary pump cell 50 is feed-back controlled so that the electromotive force V1 in the oxygen-partial-pressure detection sensor cell 81 for auxiliary pump control is at a target voltage value $V1_{SET}$, and the main pump current Ip0 of the pulse power supply 24 is feed-back controlled in the main pump cell 21 so that the auxiliary pump current Ip1 is at a target current value $Ip1_{SET}$. This makes it possible to detect the measurement pump current Ip2 as a current value depending on the concentration of NOx in the measurement-object gas as in the case of the above-described embodiment.

In the gas sensor 100 of the above embodiment, as shown in FIG. 1, the sensor element 101 has a structure in which three internal cavities, the first internal cavity 20, the second internal cavity 40, and the third internal cavity 61 are provided and the inner main pump electrode 22, the auxiliary pump electrode 51, and the measurement electrode 44 are respectively disposed in these internal cavities. However, the structure of the sensor element 101 is not limited thereto. For example, the sensor element 101 may have a structure in which two internal cavities, the first internal cavity 20 and the second internal cavity 40 are provided, the inner main pump electrode 22 is disposed in the first internal cavity 20, and the auxiliary pump electrode 51 and the measurement electrode 44 are disposed in the second internal cavity 40. In this case, for example, a porous protective layer covering the measurement electrode 44 may be formed as a diffusion-rate limiting part between the auxiliary pump electrode 51 and the measurement electrode 44.

In the gas sensor 100 of the above embodiment, the outer pump electrode 23 has three functions as an outer main pump electrode in the main pump cell 21, an outer auxiliary pump electrode in the auxiliary pump cell 50, and an outer measurement electrode in the measurement pump cell 41. However, the outer pump electrode 23 is not limited thereto. For example, the outer main pump electrode, the outer auxiliary pump electrode, and the outer measurement electrode may be formed as different electrodes. For example, any one or more of the outer main pump electrode, the outer auxiliary pump electrode, and the outer measurement electrode may be provided on the outer surface of the base part 102 separately from the outer pump electrode 23 so as to be in contact with a measurement-object gas. Alternatively, the reference electrode 42 may also serve as any one or more of the outer main pump electrode, the outer auxiliary pump electrode, and the outer measurement electrode.

As described above, according to the present invention, it is possible to more accurately control the concentration of residual oxygen in a measurement-object gas that reaches the measurement electrode and therefore to measure a target gas to be measured with high accuracy even in a low concentration range of about 10 to 500 ppm. As a result, it is possible to accurately measure a target gas to be measured within a wide concentration range (e.g., 10 to 5000 ppm) including a target gas to be measured with a low concentration.

Further, according to the present invention, the gas sensor 100 is configured to set the target voltage value $V1_{SET}$ based on the electric potential difference V0 while measuring the concentration of NOx. Therefore, according to the present invention, the gas sensor 100 can more accurately control the concentration of residual oxygen in a measurement-object gas that reaches the measurement electrode while continuously measuring a target gas to be measured (in this embodiment, NOx) in the measurement-object gas. As a result, it is possible to continuously and accurately measure the concentration of NOx even when the concentration of NOx in the measurement-object gas is low.

EXPLANATION OF REFERENCE SIGNS IN THE DRAWINGS

1: first substrate layer; 2: second substrate layer; 3: third substrate layer; 4: first solid electrolyte layer; 5: spacer layer; 6: second solid electrolyte layer; 10: gas inlet; 11: first diffusion-rate limiting part; 12: buffer space; 13: second diffusion-rate limiting part; 15: measurement-object gas flow part; 20: first internal cavity; 21: main pump cell; 22: inner main pump electrode; 22a: ceiling electrode portion (of the inner main pump electrode); 22b: bottom electrode portion (of the inner main pump electrode); 23: outer pump electrode; 24: pulse power supply; 30: third diffusion-rate limiting part; 40: second internal cavity; 41: measurement pump cell; 42: reference electrode; 43: reference gas introduction space; 44: measurement electrode; 46: variable power supply (of the measurement pump cell); 48: air introduction layer; 50: auxiliary pump cell; 51: auxiliary pump electrode; 51a: ceiling electrode portion (of the auxiliary pump electrode); 51b: bottom electrode portion (of the auxiliary pump electrode); 52: variable power supply (of the auxiliary pump cell); 60: fourth diffusion-rate limiting part; 61: third internal cavity; 70: heater part; 71: heater electrode; 72: heater; 73 through hole; 74 heater insulating layer; 75: pressure relief vent; 76: heater lead; 77: heater power supply; 80: oxygen-partial-pressure detection sensor cell for main pump control; 81: oxygen-partial-pressure detection sensor cell for auxiliary pump control; 82: oxygen-partial-pressure detection sensor cell for measurement pump control; 83: sensor cell; 90: control unit; 91: control part; 92: drive control part; 93: concentration calculating part; 94: setting part; 100: gas sensor; 101: sensor element; and 102: base part.

What is claimed is:
1. A gas sensor for detecting a target gas to be measured in a measurement-object gas, the gas sensor comprising a sensor element and a control unit for controlling the sensor element, wherein
the sensor element comprises:
a base part in an elongated plate shape, including an oxygen-ion-conductive solid electrolyte layer;
a measurement-object gas flow part formed from one end part in a longitudinal direction of the base part;
a main pump cell that includes: an inner main pump electrode disposed on an inner surface of the measurement-object gas flow part; and an outer main pump electrode disposed at a position different from the measurement-object gas flow part on the base part and corresponding to the inner main pump electrode;
an auxiliary pump cell that includes: an inner auxiliary pump electrode disposed at a position farther from the one end part in the longitudinal direction of the base part than the inner main pump electrode on the inner surface of the measurement-object gas flow part; and an outer auxiliary pump electrode disposed at a position different from the measurement-object gas flow part on the base part and corresponding to the inner auxiliary pump electrode;

a measurement pump cell that includes: an inner measurement electrode disposed at a position farther from the one end part in the longitudinal direction of the base part than the inner auxiliary pump electrode on the inner surface of the measurement-object gas flow part; and an outer measurement electrode disposed at a position different from the measurement-object gas flow part on the base part and corresponding to the inner measurement electrode; and a reference electrode disposed inside the base part to be in contact with a reference gas, wherein, in the main pump cell, a repeatedly on-off controlled main pump current is configured to be applied so that an auxiliary pump current in the auxiliary pump cell is at a predetermined target current value, and in the auxiliary pump cell, the auxiliary pump current is configured to be applied so that an electromotive force between the inner auxiliary pump electrode and the reference electrode is at a predetermined target voltage value, and the control unit comprises:

a control power supply for applying the repeatedly on-off controlled main pump current in the main pump cell; and a setting part for setting the target voltage value in the auxiliary pump cell, wherein the setting part is configured to obtain an electric potential difference between the inner main pump electrode and the reference electrode, and to set the target voltage value in the auxiliary pump cell based on the electric potential difference.

2. The gas sensor according to claim 1, wherein the setting part is configured to obtain the electric potential difference between the inner main pump electrode and the reference electrode in an off period in which the main pump current does not flow by the control power supply in the main pump cell.

3. The gas sensor according to claim 1, wherein the setting part is configured to obtain the electric potential difference between the inner main pump electrode and the reference electrode in a stable period in which the main pump current does not flow by the control power supply in the main pump cell and the electric potential difference does not change due to the main pump current that was flowing.

4. The gas sensor according to claim 1, wherein the control power supply comprises a pulse power supply for cyclically turning the main pump current on and off, and the setting part is configured to obtain the electric potential difference between the inner main pump electrode and the reference electrode in each cycle T of the pulse power supply at a predetermined time point included in an off period in which the main pump current does not flow by the pulse power supply during the cycle T.

5. A control method of a gas sensor for detecting a target gas to be measured in a measurement-object gas, the gas sensor comprising a sensor element and a control unit for controlling the sensor element, wherein the sensor element comprises:

a base part in an elongated plate shape, including an oxygen-ion-conductive solid electrolyte layer;

a measurement-object gas flow part formed from one end part in a longitudinal direction of the base part;

a main pump cell that includes: an inner main pump electrode disposed on an inner surface of the measurement-object gas flow part; and an outer main pump electrode disposed at a position different from the measurement-object gas flow part on the base part and corresponding to the inner main pump electrode;

an auxiliary pump cell that includes: an inner auxiliary pump electrode disposed at a position farther from the one end part in the longitudinal direction of the base part than the inner main pump electrode on the inner surface of the measurement-object gas flow part; and an outer auxiliary pump electrode disposed at a position different from the measurement-object gas flow part on the base part and corresponding to the inner auxiliary pump electrode;

a measurement pump cell that includes: an inner measurement electrode disposed at a position farther from the one end part in the longitudinal direction of the base part than the inner auxiliary pump electrode on the inner surface of the measurement-object gas flow part; and an outer measurement electrode disposed at a position different from the measurement-object gas flow part on the base part and corresponding to the inner measurement electrode; and a reference electrode disposed inside the base part to be in contact with a reference gas, and the control unit comprises:

a control power supply for applying a repeatedly on-off controlled main pump current in the main pump cell, and the control method comprising:

a setting step of obtaining an electric potential difference generated between the inner main pump electrode and the reference electrode, and setting a target voltage value of an electromotive force between the inner auxiliary pump electrode and the reference electrode in the auxiliary pump cell based on the electric potential difference; and an oxygen concentration adjusting step of controlling the control power supply to apply the repeatedly on-off controlled main pump current in the main pump cell so that an auxiliary pump current flowing through the auxiliary pump cell is at a predetermined target current value, and applying the auxiliary pump current in the auxiliary pump cell so that an electromotive force between the inner auxiliary pump electrode and the reference electrode is at the target voltage value.

6. The control method according to claim 5, wherein, in the setting step, the electric potential difference generated between the inner main pump electrode and the reference electrode is obtained in an off period in which the main pump current does not flow by the control power supply in the main pump cell.

7. The control method according to claim 5, wherein, in the setting step, the electric potential difference generated between the inner main pump electrode and the reference electrode is obtained in a stable period in which the main pump current does not flow by the control power supply in the main pump cell and the electric potential difference does not change due to the main pump current that was flowing.

8. The control method according to claim 5, wherein the control power supply comprises a pulse power supply for cyclically turning the main pump current on and off, and in the setting step, the electric potential difference generated between the inner main pump electrode and the reference electrode is obtained in each cycle T of the pulse power supply at a predetermined time point included in an off period in which the main pump current does not flow by the pulse power supply during the cycle T.

* * * * *